United States Patent
Hamada et al.

(10) Patent No.: US 11,158,193 B2
(45) Date of Patent: Oct. 26, 2021

(54) POSITION ESTIMATION APPARATUS, POSITION ESTIMATION METHOD, AND COMPUTER READABLE MEDIUM

(71) Applicant: Mitsubishi Electric Corporation, Tokyo (JP)

(72) Inventors: Yuji Hamada, Tokyo (JP); Takashi Maeda, Tokyo (JP); Takayoshi Takehara, Tokyo (JP); Yoshiaki Adachi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/608,595

(22) PCT Filed: May 22, 2017

(86) PCT No.: PCT/JP2017/018986
§ 371 (c)(1),
(2) Date: Oct. 25, 2019

(87) PCT Pub. No.: WO2018/216058
PCT Pub. Date: Nov. 29, 2018

(65) Prior Publication Data
US 2021/0118302 A1    Apr. 22, 2021

(51) Int. Cl.
*G08G 1/16*     (2006.01)
(52) U.S. Cl.
CPC ............ *G08G 1/166* (2013.01); *G08G 1/167* (2013.01)

(58) Field of Classification Search
None
See application file for complete search history.

(56) References Cited

U.S. PATENT DOCUMENTS 9,836,961 B2 * 12/2017 Koo ................. G08G 1/096791
10,169,895 B2 *  1/2019 Saito ................... G06K 9/00805
10,192,431 B2 *  1/2019 Mende ..................... G01S 13/91
(Continued)

FOREIGN PATENT DOCUMENTS

JP    2007-168788 A    7/2007
JP    2010-146177 A    7/2010
(Continued)

OTHER PUBLICATIONS

International Search Report for PCT/JP2017/018986 (PCT/ISA/210) dated Aug. 22, 2017, with English translation.
(Continued)

*Primary Examiner* — Chico A Foxx
(74) *Attorney, Agent, or Firm* — Birch, Stewart, Kolasch & Birch, LLP.

(57) ABSTRACT

A reference identification unit identifies a target reference position to be a reference from a position history indicated in target information, based on a movement state of a target object, and identifies a nearby reference position to be a reference from a position history indicated in nearby information, based on a movement state, estimated from the nearby information, of a nearby object which is a mobile object present in the vicinity of the target object. A position estimation unit estimates a relative position between the target object and the nearby object, based on the target reference position and the nearby reference position.

12 Claims, 22 Drawing Sheets

(56) References Cited

U.S. PATENT DOCUMENTS

| | | | |
|---|---|---|---|
| 2001/0037165 A1* | 11/2001 | Shirai | G01S 17/931 |
| | | | 701/1 |
| 2002/0003489 A1* | 1/2002 | Samukawa | G01S 17/42 |
| | | | 342/70 |
| 2010/0010699 A1* | 1/2010 | Taguchi | G08G 1/167 |
| | | | 701/23 |
| 2010/0315215 A1* | 12/2010 | Yuda | G08G 1/167 |
| | | | 340/435 |
| 2013/0054127 A1 | 2/2013 | Yamashiro | |
| 2013/0158830 A1 | 6/2013 | Kurumisawa et al. | |
| 2013/0325311 A1* | 12/2013 | Yoo | G08G 1/166 |
| | | | 701/301 |
| 2014/0222278 A1* | 8/2014 | Fujita | B60W 30/09 |
| | | | 701/25 |
| 2015/0294571 A1 | 10/2015 | Shida et al. | |
| 2015/0334269 A1* | 11/2015 | Yokota | B60W 30/143 |
| | | | 382/103 |
| 2016/0133128 A1* | 5/2016 | Koo | G08G 1/163 |
| | | | 701/117 |
| 2017/0039855 A1* | 2/2017 | Maeda | B60W 30/09 |
| 2017/0046959 A1* | 2/2017 | Nakai | G06K 9/00791 |
| 2017/0287335 A1* | 10/2017 | Ansari | B60W 40/04 |
| 2017/0327118 A1* | 11/2017 | Masui | B60W 40/072 |
| 2018/0015923 A1* | 1/2018 | Kurumisawa | G08G 1/056 |
| 2018/0056995 A1* | 3/2018 | Deng | B60W 10/184 |
| 2018/0151071 A1* | 5/2018 | Park | G01S 19/13 |
| 2018/0208140 A1* | 7/2018 | Sugimoto | G08G 1/09 |
| 2018/0239015 A1* | 8/2018 | Nishida | B62D 15/025 |
| 2018/0321686 A1* | 11/2018 | Kanzawa | G08G 1/166 |
| 2019/0039593 A1* | 2/2019 | Oyama | B60W 10/20 |
| 2019/0118807 A1* | 4/2019 | Takaki | B60W 30/09 |
| 2019/0295419 A1* | 9/2019 | Tosa | B62D 6/001 |
| 2020/0312148 A1* | 10/2020 | Hamada | G01S 19/48 |

FOREIGN PATENT DOCUMENTS

| | | |
|---|---|---|
| JP | 2010-170239 A | 8/2010 |
| JP | 2011-243084 A | 12/2011 |
| JP | 2012-022671 A | 2/2012 |
| JP | 2012-221452 A | 11/2012 |
| JP | 2012-252565 A | 12/2012 |
| JP | 2013-047903 A | 3/2013 |
| JP | 2013-125403 A | 6/2013 |
| JP | 2013-140544 A | 7/2013 |
| JP | 5472238 B2 | 4/2014 |
| JP | 2014-109795 A | 6/2014 |
| JP | 2014-215092 A | 11/2014 |
| JP | 2016-091322 A | 5/2016 |
| JP | 6003786 B2 | 10/2016 |
| JP | 6129428 B1 | 5/2017 |
| WO | WO 2017/122354 A1 | 7/2017 |

OTHER PUBLICATIONS

German Office Action for German Application No. 11 2017 007 454.1, dated Jun. 9, 2020, with an English translation.

Office Action dated Jun. 2, 2021 in corresponding Chinese Application No. 201780090762.7.

\* cited by examiner

Fig. 3

| MOVEMENT STATE | PARTICULAR STATE | IDENTIFICATION INFORMATION |
|---|---|---|
| MOVING STRAIGHT AHEAD (R>th) | ○ | CURRENT POSITION |
| | × | CLOSEST POSITION |
| CURVE (th'<R≤th) | ○ | CURRENT POSITION |
| | × | CLOSEST POSITION |
| DURING TURNING (R≤th') | ○ | CURRENT POSITION |
| | × | HISTORY POINT BEFORE TURNING |
| AFTER TURNING (AFTER RIGHT OR LEFT TURN) | ○ | CURRENT POSITION |
| | × | CLOSEST POSITION |
| WAITING TO TURN RIGHT (STEERING CHANGE BEFORE STOPPING) | ○ | CURRENT POSITION |
| | × | HISTORY POINT BEFORE TURNING |

Fig.14

| MOVEMENT STATE | AREA SHAPE | AREA ROTATION AMOUNT |
|---|---|---|
| MOVING STRAIGHT AHEAD (R>th) | RECTANGULAR | NONE |
| CURVE (th<R<th') | CURVILINEAR | NONE |
| DURING TURNING (R<th') | RECTANGULAR | ORIENTATION DIFFERENCE |
| POSITION ERROR (E>th") | TRAPEZOIDAL | NONE |
| WAITING TO TURN RIGHT | RECTANGULAR | ORIENTATION CHANGE AMOUNT FROM REFERENCE |

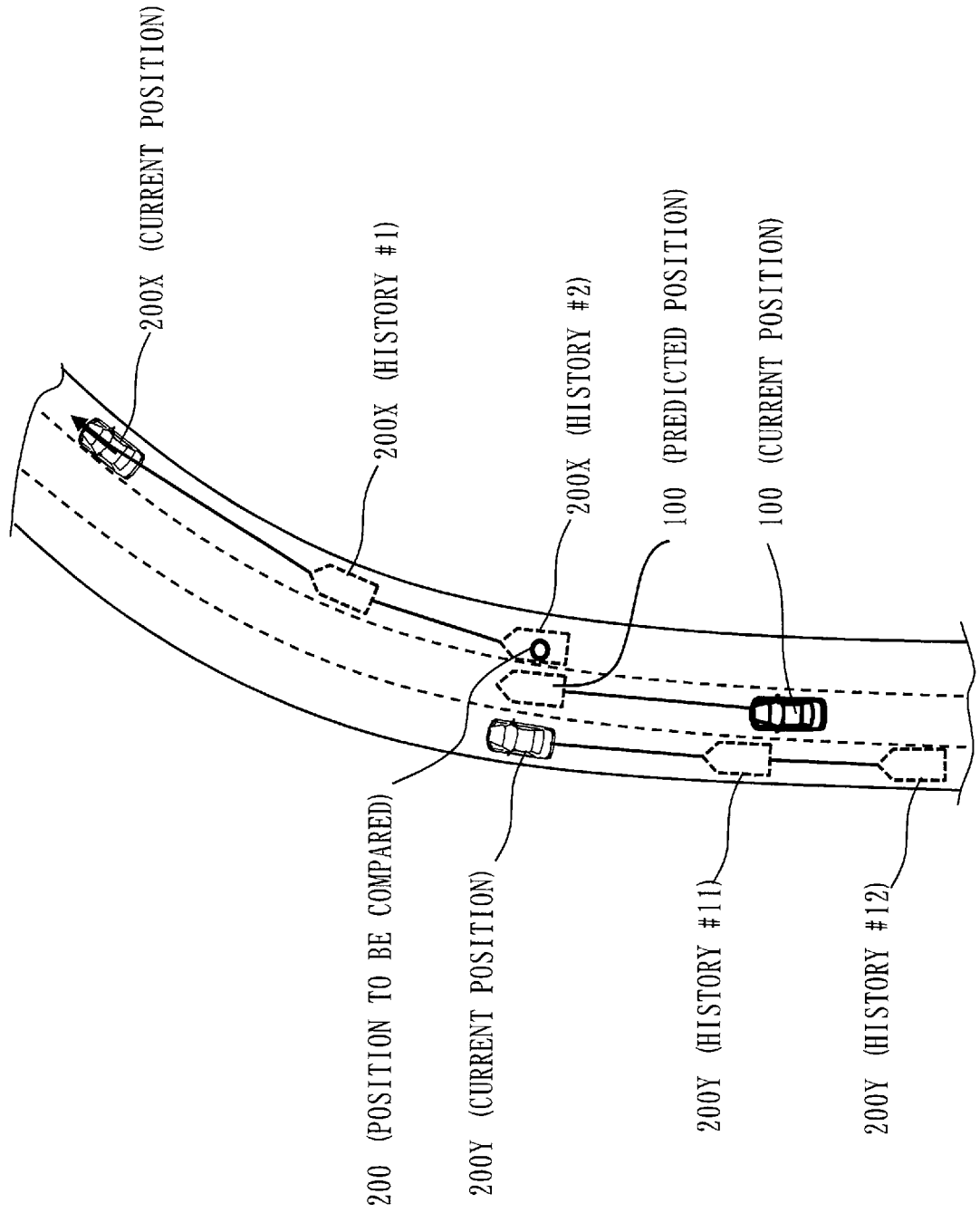

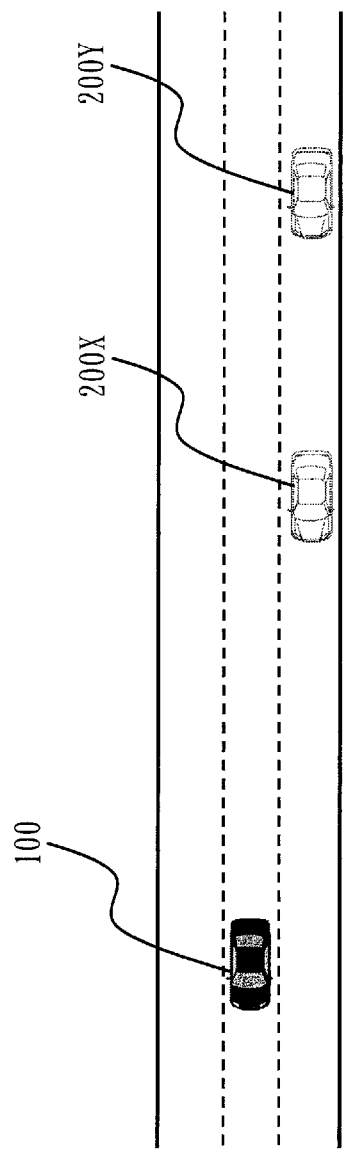

POSITION ESTIMATION APPARATUS, POSITION ESTIMATION METHOD, AND COMPUTER READABLE MEDIUM

TECHNICAL FIELD

The present invention relates to a technique for estimating a relative position of a nearby mobile object with respect to a target mobile object.

BACKGROUND ART

There has been developed a driving assistance system using an in-vehicle communication device that transmits and receives vehicle information including position information of a vehicle and the like by wireless communication at fixed intervals. In the driving assistance system, it is determined based on the transmitted and received vehicle information whether or not there is a risk of collision, so as to provide information to a driver or perform control of the vehicle.

The position information of the vehicle indicated in the vehicle information is acquired using positioning satellites, such as the Global Positioning System (GPS) and Global Navigation Satellite System (GNSS). However, the position information acquired using the positioning satellites includes errors caused by delays in signals in the ionosphere, multipath due to a building or the like, and system delays. Because of the influence of these errors, a possibility exists that the risk of collision for the driving assistance system cannot be accurately determined.

Patent Literature 1 describes a technique in which a relative position estimation method on a straight road and a relative position estimation method on a curved road are switched according to an angle of orientation of a preceding vehicle, so as to determine the positional relationship with the preceding vehicle.

Patent Literature 2 describes a technique in which a determination angle of a rearward area is changed according to an angle of crossing with a road on which a vehicle travels and a swing angle when the vehicle makes a right or left turn.

CITATION LIST

Patent Literature

Patent Literature 1: JP 2014-215092 A
Patent Literature 2: JP 2016-091322 A

SUMMARY OF INVENTION

Technical Problem

In the technique described in Patent Literature 1, the relative position estimation methods are switched in accordance with traveling on a straight road or traveling on a curved road. However, when the preceding vehicle is traveling outside the detection range of a ranging sensor, it cannot be accurately recognized as the preceding vehicle, so that the positional relationship with a target vehicle cannot be accurately determined.

In Patent Literature 2, the rearward area is rotated based on the angle of crossing with the road and the swing angle of the vehicle. However, depending on the determination accuracy of the swing angle, an erroneous determination may occur as a result of rotating the rearward area.

It is an object of the present invention to allow a relative position between mobile objects to be appropriately recognized.

Solution to Problem

A position estimation apparatus according to the present invention includes:
an acquisition unit to, while a target object which is a mobile object is moving, acquire target information indicating a position history of the target object, and acquire nearby information indicating a position history of a nearby object which is a mobile object different from the target object;
a reference identification unit to identify a target reference position to be a reference from the position history indicated in the target information, based a movement state of the target object estimated from the target information acquired by the acquisition unit, and identify a nearby reference position to be a reference from the position history indicated in the nearby information, based on a movement state of the nearby object estimated from the nearby information; and
a position estimation unit to estimate a relative position between the target object and the nearby object, based on the target reference position and the nearby reference position that are identified by the reference identification unit.

Advantageous Effects of Invention

In the present invention, a target reference position is identified based on a movement state of a target object estimated from a position history of the target object, and a nearby reference position is identified based on a movement state of a nearby object estimated from a position history of the nearby object. Then, a relative position between the target object and the nearby object is estimated based on the target reference position and the nearby reference position. The target reference position and the nearby reference position that are appropriate can be used, so that the relative position between the target object and the nearby object can be appropriately estimated.

BRIEF DESCRIPTION OF DRAWINGS

FIG. 3 is a diagram illustrating information stored in a judgment criteria table 123 according to the first embodiment;

FIG. 14 is a diagram illustrating information stored in an area management table 124 according to the second embodiment;

FIG. 21 is an explanatory diagram of a method for identifying the target reference position 34 and the nearby reference position 35 according to the sixth variation; and FIG. 22 is an explanatory diagram of a method for estimating a relative position between a target object 100 and a nearby object 200 according to a fourth embodiment.

DESCRIPTION OF EMBODIMENTS

First Embodiment

Description of Configuration

Figure 1:
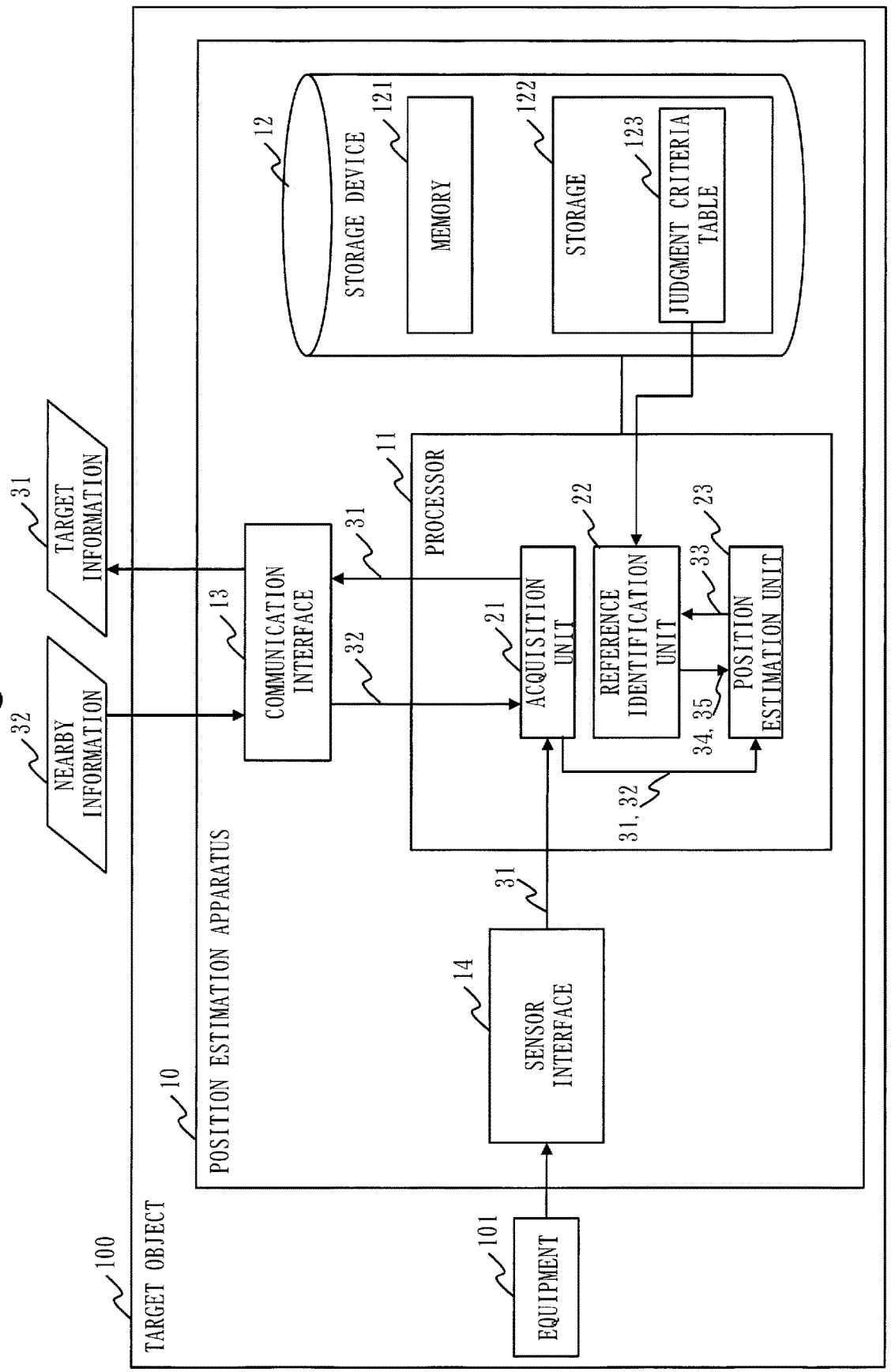
FIG. 1 is a configuration diagram of a position estimation apparatus 10 according to a first embodiment.

A configuration of a position estimation apparatus 10 according to a first embodiment will be described with reference to FIG. 1.

The position estimation apparatus 10 is a computer belonging to a target object 100 which is a mobile object such as a vehicle. In the first embodiment, the target object 100 is a vehicle.

Note that the position estimation apparatus 10 may be implemented in a form integrated with or inseparable from the target object 100 or another component illustrated in the drawing, or may be implemented in a form detachable from or separable from the target object 100 or another component illustrated in the drawing.

The position estimation apparatus 10 includes hardware of a processor 11, a storage device 12, a communication interface 13, and a sensor interface 14. The processor 11 is connected with other hardware components via signal lines and controls these other hardware components.

The processor 11 is an integrated circuit (IC) for executing instructions described in a program so as to execute processes such as data transfer, calculation, processing, control, and management. The processor 11 has an arithmetic circuit and has a register and a cache memory to store the instructions and information. Specifically, the processor 11 is a central processing unit (CPU), a digital signal processor (DSP), or a graphics processing unit (GPU).

The storage device 12 includes a memory 121 and a storage 122. Specifically, the memory 121 is a random access memory (RAM). Specifically, the storage 122 is a hard disk drive (HDD). Alternatively, the storage 122 may be a portable storage medium, such as a Secure Digital (SD, registered trademark) memory card, CompactFlash (CF), a NAND flash, a flexible disk, an optical disc, a compact disc, a Blu-ray (registered trademark) disc, or a DVD.

The communication interface 13 is a device including a receiver that receives data and a transmitter that transmits data. Specifically, the communication interface 13 is a communication chip or a network interface card (NIC).

The communication interface 13 uses a communication protocol such as Dedicated Short Range Communication (DSRC) dedicated to vehicle communication or IEEE 802.11p. Alternatively, the communication interface 13 may use a mobile telephone network such as Long Term Evolution (LTE, registered trademark) or 4G. Alternatively, the communication interface 13 may use Bluetooth (registered trademark) or a wireless LAN such as IEEE 802.11a/b/g/n.

The sensor interface 14 is a device for connecting equipment 101, such as an in-vehicle electronic control unit (ECU), a speed sensor, an acceleration sensor, an orientation sensor, and electric power steering (EPS). Specifically, the sensor interface 14 is a sensor electronic control unit (ECU).

The position estimation apparatus 10 includes, as functional components, an acquisition unit 21, a reference identification unit 22, and a position estimation unit 23. The functions of the functional components of the position estimation apparatus 10 are realized by software.

The storage 122 of the storage device 12 stores programs for realizing the functions of the functional components of the position estimation apparatus 10. These programs are loaded into the memory 121 by the processor 11 and executed by the processor 11. In this way, the functions of the units of the position estimation apparatus 10 are realized.

The storage 122 also stores a judgment criteria table 123.

Information, data, signal values, and variable values that indicate results of processes of the functional components realized by the processor 11 are stored in the memory 121, or a register or a cache memory in the processor 11. In the following description, it is assumed that information, data, signal values, and variable values that indicate results of processes of the functional components realized by the processor 11 are stored in the memory 121.

In FIG. 1, only one processor 11 is illustrated. However, there may be a plurality of processors 11, and the plurality of processors 11 may cooperate to execute the programs for realizing the functions.

Description of Operation

The operation of the position estimation apparatus 10 according to the first embodiment will be described with reference to FIGS. 2 to 10.

The operation of the position estimation apparatus 10 according to the first embodiment corresponds to a position estimation method according to the first embodiment. The operation of the position estimation apparatus 10 according to the first embodiment also corresponds to processes of a position estimation program according to the first embodiment.

Relative areas 40 according to the first embodiment will be described with reference to FIG. 2.

The relative areas 40 are a plurality of areas obtained by dividing an area around the target object 100 which is a mobile object on which the position estimation apparatus 10 is mounted.

In the first embodiment, the relative areas 40 are defined as area A (Ahead), area AL (Ahead Left), area AR (Ahead Right), area AFL (Ahead Far Left), area AFR (Ahead Far Right), area B (Behind), area BL (Behind Left), area BR (Behind Right), area BFL (Behind Far Left), area BFR (Behind Far Right), area IL (Intersecting Left), and area IR (Intersecting Right).

The relative areas 40 may be set by other methods, such as division into smaller areas.

Area A is ahead of the target object 100 in a lane in which the target object 100 is present. Area AL is ahead of the target object 100 in an adjacent lane to the left of the target object 100. Area AR is ahead of the target object 100 in an adjacent lane to the right of the target object 100. Area AFL is ahead of the target object 100 in a second or subsequent adjacent lane to the left of the target object 100. Area AFR is ahead of the target object 100 in a second or subsequent adjacent lane to the right of the target object 100.

Area B is behind the target object 100 in the same lane as that of the target object 100. Area BL is behind the target object 100 in the adjacent lane to the left of the target object 100. Area BR is behind the target object 100 in the adjacent lane to the right of the target object 100. Area BFL is behind the target object 100 in the second or subsequent adjacent lane to the left of the target object 100. Area BFR is behind the target object 100 in the second or subsequent adjacent lane to the right of the target object 100.

Area IL is a road after a left turn at an intersection ahead of the target object 100. Area IR is a road after a right turn at the intersection ahead of the target object 100.

Note that a possibility exists that distinguishing area IL and area AFL and distinguishing area IR and area AFR may be difficult with only a relative position. In this case, a movement direction of the nearby object 200 may be identified based on changes in the position of the nearby object 200 in a past reference period, and the identified movement direction may be used to distinguish area IL and area AFL and distinguish area IR and area AFR.

Information stored in the judgment criteria table 123 according to the first embodiment will be described with reference to FIG. 3.

The judgment criteria table 123 stores identification information for identifying a reference position according to each movement state and a particular state. A reference position is a position used to estimate a relative position between the target object 100 and the nearby object 200 which is a mobile object different from the target object 100. A reference position of the target object 100 will be referred to as a target reference position 34, and a reference position of the nearby object 200 will be referred to as a nearby reference position 35.

A movement state indicates a shape of a road being traveled and a position on the road being traveled. In FIG. 3, "moving straight ahead", "curve", "during turning", "after turning", and "waiting to turn right" are indicated as movement states. "Moving straight ahead" is a case where a radius of curvature R is greater than a threshold th. "Curve" is a case where the radius of curvature R is smaller than or equal to the threshold th and the radius of curvature R is greater than a threshold th'. "During turning" is a case where the radius of curvature R is smaller than or equal to the threshold th'. For example, the threshold th is 500 m, and the threshold th' is 200 m. "After turning" is a fixed time period after turning is completed and is a period after a right or left turn. "Waiting to turn right" is a state in which a right turn is about to be made. "Waiting to turn right" can be estimated based on a steering change before the mobile object stops. The movement states are not limited to the states indicated in FIG. 3 and may be different states.

The particular state is a state in which a preceding one of the mobile objects of the target object 100 and the nearby object 200 has made a right or left turn, and then a following one of the mobile objects has not made a right or left turn. That is, one of the target object 100 and the nearby object 200 has made a right or left turn, and the other has not made a right or left turn.

An example of identifying a reference position according to the first embodiment will be described with reference to FIG. 4.

Figure 4:
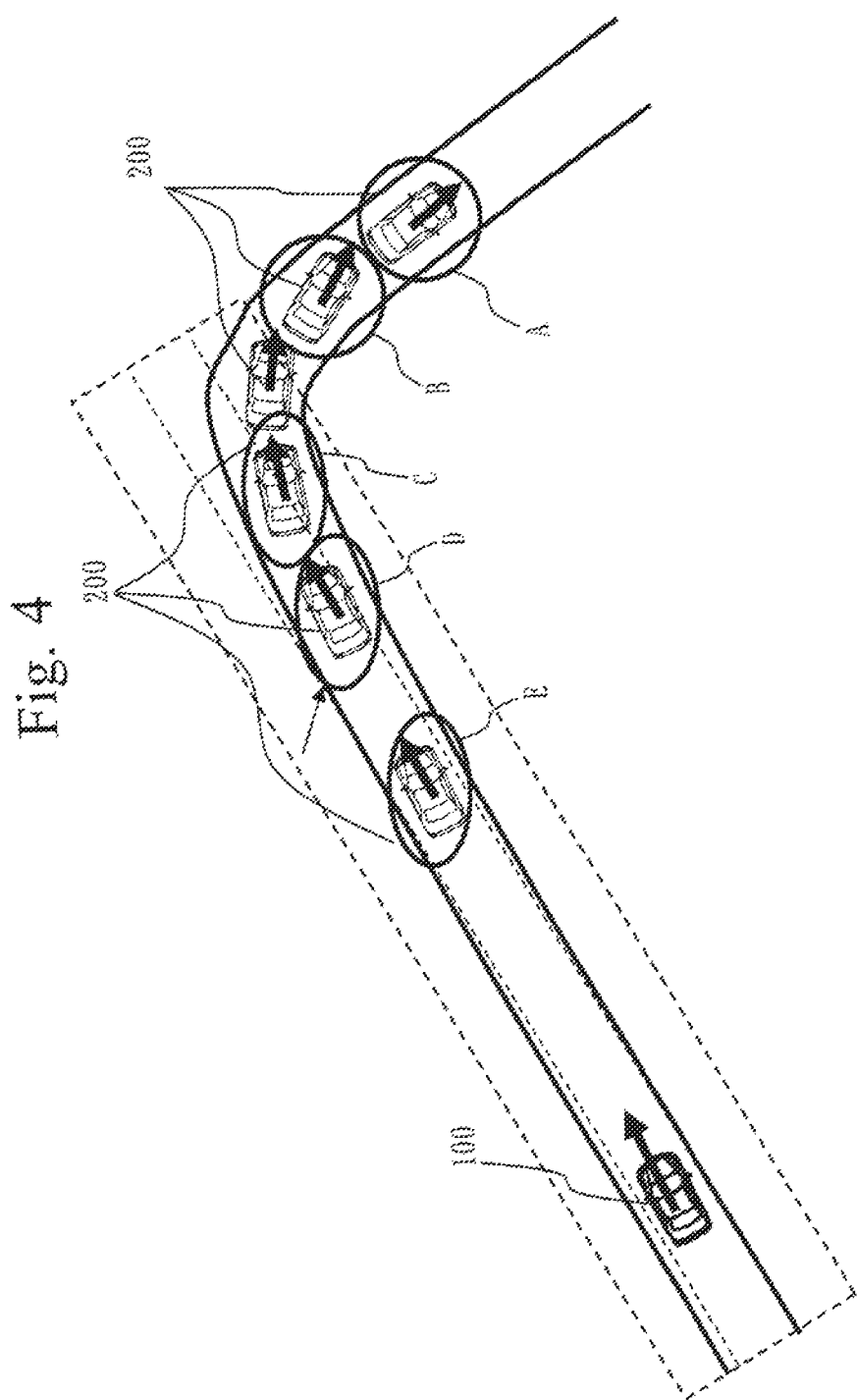
FIG. 4 is an explanatory diagram of an example of identifying a reference position according to the first embodiment.

FIG. 4 illustrates an example of identifying the nearby reference position 35 which is a reference position of the nearby object 200. FIG. 4 illustrates states of the nearby object 200, which is moving ahead of the target object 100, from before the nearby object 200 makes a right turn to after the nearby object 200 has made a right turn. Specifically, point A indicates after turning, point C to point B indicate during turning, point D indicates before turning, point D indicates a curve, and point E indicates the closest point.

When the nearby object 200 is moving at point A, this is after turning. This is a state in which the nearby object 200 has made a right turn and the target object 100 has not made a right turn. Therefore, based on the identification information stored in the judgment criteria table 123 illustrated in FIG. 3, point A which is the current position is identified as the nearby reference position 35.

When the nearby object 200 is moving at point B, this is during turning. Since turning is not completed, the nearby object 200 has not made a right turn. The target object 100 has also not made a right turn. Therefore, based on the identification information stored in the judgment criteria table 123 illustrated in FIG. 3, point D which is a point before turning is identified as the nearby reference position 35.

When the nearby object 200 is moving at point D, this is during movement on a curve. The nearby object 200 and the target object 100 have not made a right turn. Therefore, based on the identification information stored in the judgment criteria table 123 illustrated in FIG. 3, point E which is the closest point is identified as the nearby reference position 35.

Figure 5:
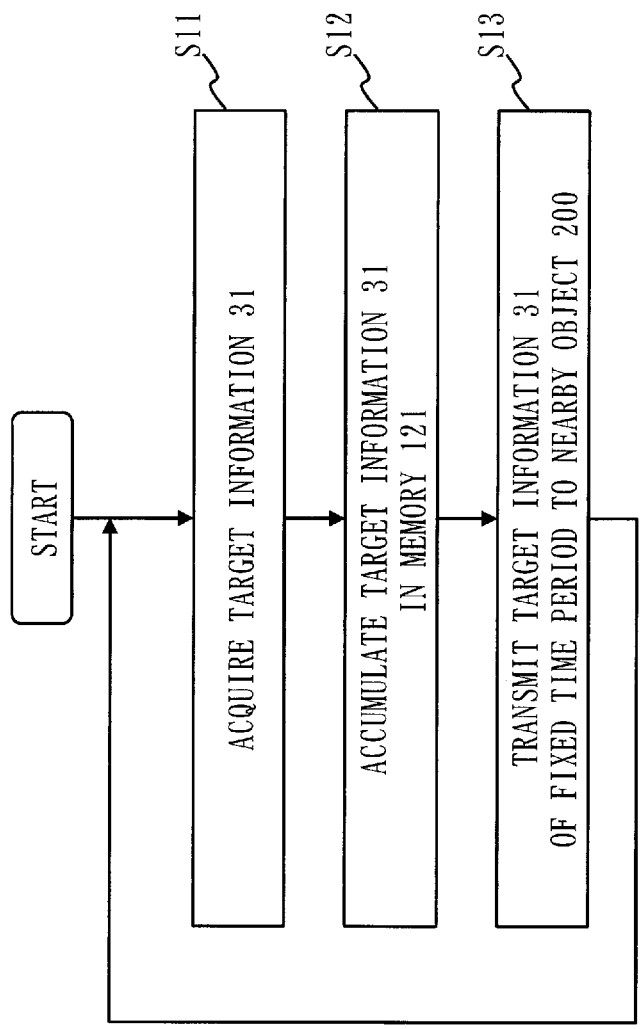
FIG. 5 is a flowchart of processes to acquire information on a target object 100 and transmit the information to a nearby object 200 according to the first embodiment.
Figure 6:
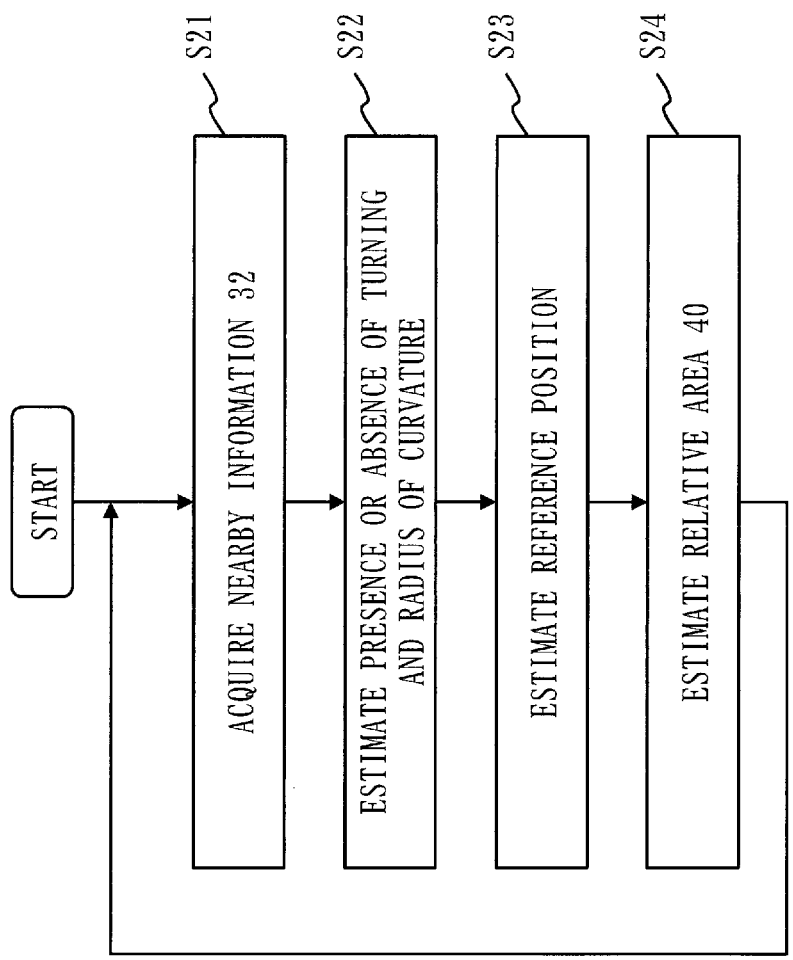
FIG. 6 is a flowchart of processes to acquire information on the nearby object 200 and estimate a relative area 40 according to the first embodiment.

The overall operation of the position estimation apparatus 10 according to the first embodiment will be described with reference to FIGS. 5 and 6.

The overall operation of the position estimation apparatus 10 includes processes to acquire information on the target object 100 and transmit the information to the nearby object 200 and processes to acquire information on the nearby object 200 and estimate a relative area 40.

The operation of the position estimation apparatus 10 is performed while the target object 100 is moving and is temporarily at rest.

The processes to acquire information on the target object 100 and transmit the information to the nearby object 200 according to the first embodiment will be described with reference to FIG. 5.

Step S11: First Acquisition Process

The acquisition unit 21 acquires information on the target object 100 from the equipment 101 mounted on the target object 100 via the sensor interface 14. The information on the target object 100 includes a position, speed, acceleration, a traveling direction, a steering angle, a brake control state, a traveling history, a predicted trajectory, a yaw rate, accuracy of each piece of data, and the like.

Step S12: History Generation Process

The acquisition unit 21 accumulates the information on the target object 100 acquired at step S11 in the memory 121 as target information 31 indicating a history of positions and so on of the target object 100.

Specifically, the acquisition unit 21 additionally writes the information acquired at step S11 in the memory 121 at fixed distance intervals or fixed time intervals as the target object 100 moves, or for each range in which an error of the radius of curvature can be restrained from exceeding a fixed value.

Step S13: Information Transmission Process

The acquisition unit 21 transmits, via the communication interface 13, the target information 31 in a past fixed time period accumulated at step S12 to the nearby object 200 which is moving in the vicinity of the target object 100.

The processes to acquire information on the nearby object 200 and estimate a relative area 40 according to the first embodiment will be described with reference to FIG. 6. Note that when a plurality of nearby objects 200 are present in the vicinity of the target object 100, the processes illustrated in FIG. 6 are performed with each nearby object 200 as the nearby object 200 to be the subject of the processes.

Step S21: Second Acquisition Process

The acquisition unit 21 acquires nearby information 32 indicating a history of positions and so on of the nearby object 200 via the communication interface 13.

Specifically, the acquisition unit 21 receives nearby information 32 from the nearby object 200 or an external device such as a roadside unit via the communication interface 13 at fixed time intervals. The acquisition unit 21 writes the received nearby information 32 in the memory 121.

Step S22: Condition Estimation Process

The position estimation unit 23 reads the target information 31 accumulated at step S12 from the memory 121. The position estimation unit 23 also reads the nearby information 32 acquired at step S21 from the memory 121.

Then, the position estimation unit 23 estimates, for each of the target object 100 and the nearby object 200, the presence or absence of turning in a past fixed distance and the radius of curvature of the road in the past fixed distance. The presence or absence of turning and the radius of curvature of the road can be estimated based on a position history, an orientation history, a steering angle history, and the like in the past fixed distance. The position estimation unit 23 writes the estimated presence or absence of turning and the estimated radius of curvature of the road in the memory 121.

Step S23: Reference Identification Process

The reference identification unit 22 reads the presence or absence of turning and the radius of curvature of the road estimated at step S22 from the memory 121. The reference identification unit 22 refers to the judgment criteria table 123 to identify the target reference position 34 of the target object 100 and the nearby reference position 35 of the nearby object 200 that correspond to the presence or absence of turning and the radius of curvature of the road. The reference identification unit 22 writes the identified target reference position 34 and nearby reference position 35 in the memory 121.

Step S24: Position Estimation Process

The position estimation unit 23 reads the target reference position 34 and the nearby reference position 35 identified at step S23 from the memory 121. The position estimation unit 23 estimates the relative area 40 in which the nearby object 200 is present based on the target reference position 34 and the nearby reference position 35.

Herein, the processes at step S22 and the subsequent steps are performed at the timing when the nearby information 32 has been acquired. However, the processes at step S22 and the subsequent steps may be performed at fixed time intervals or at fixed traveled distance intervals, based on the latest target information 31 and nearby information 32.

The operation of the position estimation unit 23 according to the first embodiment will be described with reference to FIG. 7.

The operation of the position estimation unit 23 corresponds to the processes of step S22 and step S24. Specifically, the processes of step S31 to step S33 correspond to the process of step S22 of FIG. 6, and the processes of step S34 to step S36 correspond to the process of step S24 of FIG. 6.

Step S31: Preliminary Process

The position estimation unit 23 reads the target information 31 accumulated at step S12 from the memory 121. The position estimation unit 23 also reads the nearby information 32 acquired at step S21 from the memory 121.

The position estimation unit 23 calculates a relative distance and a relative angle between the target object 100 and the nearby object 200 at each time point in a past fixed time period, based on the target object 100 at each time point indicated in the target information 31 and the nearby object 200 at each time point indicated in the nearby information 32. The position estimation unit 23 also estimates the radius of curvature of the road at each time point in the past fixed time period.

Step S32: First Estimation Process

The position estimation unit 23 estimates the relative area 40 in which the nearby object 200 is present on a road level, based on the relative distance and the relative angle calculated at step S31, the target information 31, and the nearby information 32. In other words, the position estimation unit 23 estimates a relative position of the road on which the nearby object 200 is present with respect to the road on which the target object 100 is present.

Figure 2:
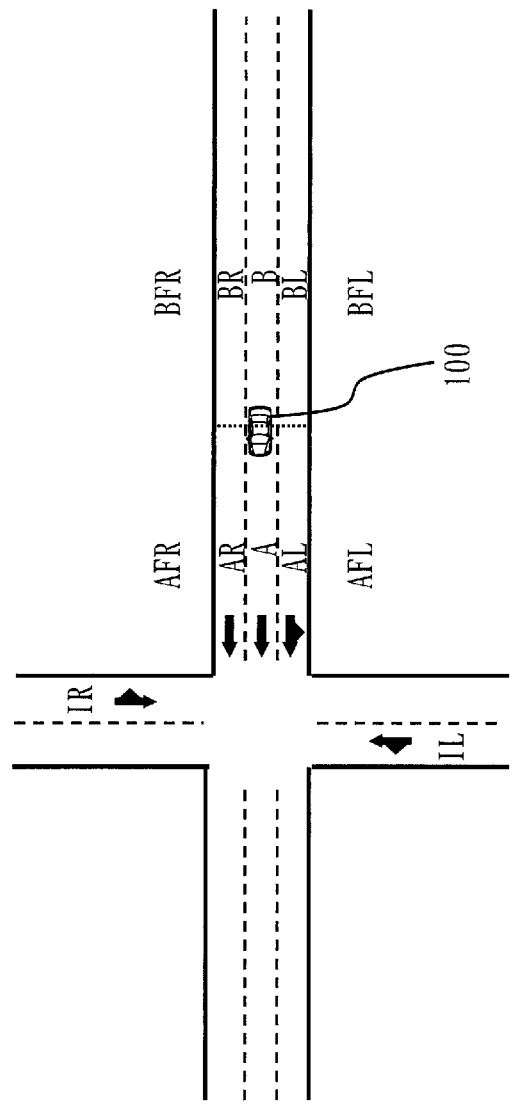
FIG. 2 is an explanatory diagram of relative areas 40 according to the first embodiment.

That is, the position estimation unit 23 estimates whether the nearby object 200 is present in one of area A, area AR, and area AL, is present in area AFR, is present in area AFL, is present in one of area B, area BR, and area BL, is present in area BFR, is present in area BFL, is present in area IR, or is present in area IL, as illustrated in FIG. 2.

Note that at this time the position estimation unit 23 also estimates, for each of the target object 100 and the nearby object 200, the presence or absence of turning and the radius of curvature of the road in the past fixed distance.

Step S33: Result Notification Process

The position estimation unit 23 notifies the reference identification unit 22 of the estimation result estimated at step S32 as an identification condition 33.

Step S34: Reference Position Notification Process

The position estimation unit 23 receives a notification of the target reference position 34 and the nearby reference position 35 that correspond to the identification condition 33 notified of at step S33.

Step S35: Second Estimation Process

The position estimation unit 23 estimates the relative area 40 in which the nearby object 200 is present on a lane level, based on the target reference position 34 and the nearby reference position 35 received at step S34. In other words, the position estimation unit 23 estimates the position of the lane in which the nearby object 200 is present with respect to the lane in which the target object 100 is present, based on the target reference position 34 and the nearby reference position 35.

That is, the position estimation unit 23 estimates whether the nearby object 200 is present in area A, is present in area AR, is present in area AL, is present in area AFR, is present in area AFL, is present in area B, is present in area BR, is present in area BL, is present in area BFR, is present in area BFL, is present in area IR, or is present in area IL, as illustrated in FIG. 2.

The position estimation unit 23 estimates the relative area 40 in which the nearby object 200 is present by taking into consideration the relative area 40 estimated at step S32.

Step S36: Result Determination Process

The position estimation unit 23 determines whether or not the relative area 40 estimated at step S35 is appropriate, based on the relationship with the relative area 40 estimated in the past fixed distance. If appropriate, the position estimation unit 23 outputs the relative area 40 estimated at step S35. On the other hand, if not appropriate, the position estimation unit 23 determines an error.

As a specific example, it is assumed that the relative area 40 estimated in the past fixed distance is area B. That is, it is assumed that the nearby object 200 has been moving behind the target object 100 in the same lane. In this case, it is not conceivable that the nearby object 200 suddenly moves to area A ahead of the target object 100. That is, in order for the nearby object 200 to move to be ahead of the target object 100, the nearby object 200 should first move to an area behind the target object 100 in a lane different from that of the target object 100 (for example, area BR). Next, the nearby object 200 should move to an area ahead of the target object 100 in that lane (for example, area AR). Then, the nearby object 200 should move to area A ahead of the target object 100. Therefore, in the case where the relative area 40 estimated in the past fixed distance is area B, if the relative area 40 in which the nearby object 200 is present is area A, it is determined to be not appropriate.

The first estimation process (step S32 of FIG. 7) according to the first embodiment will be described with reference to FIG. 8.

Step S41: Update Determination Process

The position estimation unit 23 determines whether or not at least one of the target information 31 and the nearby information 32 has been updated.

If updated, the position estimation unit 23 advances the process to step S42. On the other hand, if not updated, the position estimation unit 23 advances the process to step S48.

(Step S42: Coefficient Calculation Process)

The position estimation unit 23 calculates a correlation coefficient between the position of the target object 100 and the position of the nearby object 200.

Specifically, the position estimation unit 23 selects a time point having the shortest relative distance among the relative distances at time points calculated at step S31. The position estimation unit 23 calculates the correlation coefficient between the position of the target object 100 and the position of the nearby object 200 in a past fixed time period from the selected time point, based on the relative distances and the relative angles calculated at step S31. As a method for calculating the correlation coefficient, a conventionally known method may be used.

Note that the position estimation unit 23 may calculate the correlation coefficient by excluding those in which at least one of a relative distance and a relative angle is larger compared with others, among the relative distances and relative angles between the target object 100 and the nearby object 200 in the past fixed time period. That is, the position estimation unit 23 may calculate the correlation coefficient by excluding exception values.

Step S43: Coefficient Determination Process

If the correlation coefficient between the position of the target object 100 and the position of the nearby object 200 is higher than or equal to a threshold α, the position estimation unit 23 advances the process to step S44. If the correlation coefficient is lower than the threshold α, the position estimation unit 23 advances the process to step S48.

Step S44: State Estimation Process

The position estimation unit 23 estimates, for each of the target object 100 and the nearby object 200, the presence or absence of turning in the past fixed distance. That is, the position estimation unit 23 estimates the presence or absence of a right or left turn in the past fixed distance.

Specifically, based on a history of estimated values of the radius of curvature, the position estimation unit 23 estimates that turning has started when a transition occurs from "moving straight ahead" or "curve" with a radius of curvature greater than the threshold th' to "during turning" with a radius of curvature smaller than or equal to the threshold th'. Then, the position estimation unit 23 estimates that turning has completed when the state of "during turning" with a radius of curvature smaller than or equal to the threshold th' continues for a certain time period or longer, and then a transition occurs to "moving straight ahead" or "curve" with a radius of curvature greater than the threshold th'. Alternatively, the position estimation unit 23 may estimate that a right or left turn has been made when a change in orientation greater than or equal to a certain level has occurred within a certain distance. Alternatively, the position estimation unit 23 may determine whether or not a right or left turn has been made, based on a combination of a change in orientation within a certain distance and a change in radius of curvature.

Step S45: Turning Determination Process

If it is determined at step S44 that turning has occurred, the position estimation unit 23 advances the process to step S48. If it is determined that turning has not occurred, the position estimation unit 23 advances the process to step S46.

Step S46: Same Road Estimation Process

The position estimation unit 23 estimates that the target object 100 and the nearby object 200 are present on the same road. That is, the position estimation unit 23 estimates that the nearby object 200 is present in one of area A, area AR, and area AL, or is present in one of area B, area BR, and area BL, as illustrated in FIG. 2.

Step S47: Ahead/Behind Estimation Process

The position estimation unit 23 estimates the ahead/behind relationship between the target object 100 and the nearby object 200, based on the current position of the target object 100 indicated in the target information 31 and the current position of the nearby object 200 indicated in the nearby information 32. By this, the position estimation unit 23 estimates whether the nearby object 200 is present in one of area A, area AR, and area AL or is present in one of area B, area BR, and area BL, as illustrated in FIG. 2.

Step S48: Position Estimation Process

The position estimation unit 23 estimates the relative position of the road on which the nearby object 200 is present with respect to the road on which the target object 100 is present, based on the relative distance and the relative angle between the current position of the target object 100 and the current position of the nearby object 200 calculated at step S31.

That is, the position estimation unit 23 estimates whether the nearby object 200 is present in one of area A, area AR, and area AL, is present in area AFR, is present in area AFL, is present in one of area B, area BR, and area BL, is present in area BFR, is present in area BFL, is present in area IR, or is present in area IL, as illustrated in FIG. 2.

Step S49: Result Storage Process

The position estimation unit 23 writes the relative area 40 estimated at step S46 and step S47 or the relative area 40 estimated at step S48 in the memory 121 as a first estimation result.

The second estimation process (step S35 of FIG. 7) according to the first embodiment will be described with reference to FIG. 9.

Step S51: Notification Determination Process

The position estimation unit 23 determines whether or not the notification of the target reference position 34 and the nearby reference position 35 has been made at step S34.

If the notification has been made, the position estimation unit 23 advances the process to step S52. If the notification has not been made, the position estimation unit 23 advances the process to step S56.

Step S52: Position Estimation Process

The position estimation unit 23 estimates the position of the lane in which the nearby object 200 is present with respect to the lane in which the target object 100 is present, based on the target reference position 34 and the nearby reference position 35 included in the notification at step S34.

Specifically, the position estimation unit 23 calculates the relative distance and the relative orientation between the target reference position 34 and the nearby reference position 35. Based on the calculated relative distance and relative orientation, the position estimation unit 23 estimates the position of the lane in which the nearby object 200 is present with respect to the lane in which the target object 100 is present. That is, the position estimation unit 23 estimates whether the nearby object 200 is present in area A, is present in area AR, is present in area AL, and is present in area AFR, is present in area AFL, is present in area B, is present in area BR, is present in area BL, is present in area BFR, is present in area BFL, is present in area IR, or is present in area IL, as illustrated in FIG. 2.

Figure 10:
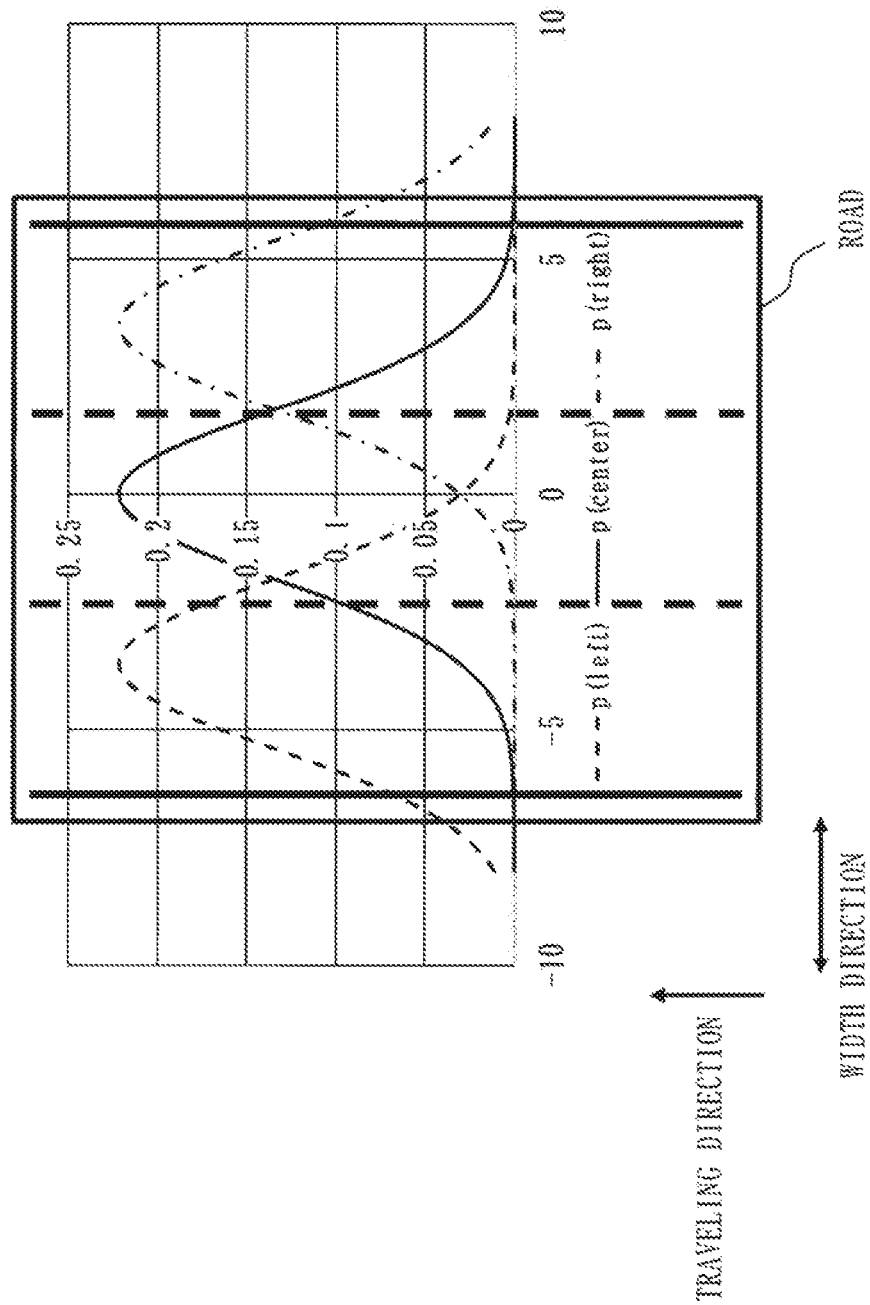
FIG. 10 is an explanatory diagram of a method for calculating a probability that the nearby object 200 is present in each lane according to the first embodiment.

At this time, the position estimation unit 23 calculates a probability that the nearby object 200 is present in each lane, according to a probability distribution defined with respect to a width direction of the road for each of the lanes constituting the road, as illustrated in FIG. 10. In FIG. 10, p(left) denotes a probability of being present in the left lane, p(center) denotes a probability of being present in the center lane, and p(right) denotes a probability of being present in the right lane. Then, the position estimation unit 23 estimates the lane in which the nearby object 200 is present, based on the sum of probabilities for the individual lanes calculated in a past reference time period.

This probability distribution is, for example, a distribution such that the closer to the central part of a lane, the higher the probability of being present in that lane. A specific example is a normal distribution in which the central position of the lane is the mean value and the lane width is the variance. Other specific examples that may be considered are employing an Erlang distribution or a gamma distribution taking into consideration a movement vector of the vehicle, or a uniform distribution.

Step S53: Result Storage Process

The position estimation unit 23 writes the relative area 40 estimated at step S52 in the memory 121 as a second estimation result.

Step S54: Result Determination Process

The position estimation unit 23 determines whether the first estimation result and the second estimation result written in the memory 121 are the relative areas 40 that are different from each other. Note that when the relative area 40 indicated in the second estimation result is included in the relative area 40 indicated in the first estimation result, the position estimation unit 23 determines that the first estimation result and the second estimation result are the same relative area 40.

If the first estimation result and the second estimation result are the relative areas 40 that are different from each other, the position estimation unit 23 advances the process to step S55. If they are the same relative area 40, the position estimation unit 23 advances the process to step S57.

Step S55: Accuracy Determination Process

The position estimation unit 23 determines whether or not an estimation accuracy of the relative area 40 estimated at step S52 is lower than a threshold β which represents a reference accuracy. When the lane is estimated using the probability distribution at step S52, the estimation accuracy is the sum of calculated probabilities, for example. The estimation accuracy may be calculated by taking into consideration the correlation coefficient calculated at step S43 or the like.

If the estimation accuracy is lower than the threshold β, the position estimation unit 23 advances the process to step S56. If the estimation accuracy is higher than or equal to the threshold β, the position estimation unit 23 advances the process to step S57.

Step S56: First Priority Process

The position estimation unit 23 determines that the first estimation result has priority. Then, the position estimation unit 23 reads the first estimation result from the memory 121 and outputs the first estimation result.

Step S57: Second Priority Process

The position estimation unit 23 determines that the second estimation result has priority. Then, the position estimation unit 23 reads the second estimation result from the memory 121 and outputs the second estimation result.

Effects of First Embodiment

As described above, the position estimation apparatus 10 according to the first embodiment identifies the target reference position 34, based on the movement state of the target object estimated from a position history of the target object 100. The position estimation apparatus 10 according to the first embodiment identifies the nearby reference position 35, based on the movement state of the nearby object 200 estimated from a position history of the nearby object 200. Then, the position estimation apparatus 10 according to the first embodiment estimates the relative position between the target object 100 and the nearby object 200, based on the target reference position 34 and the nearby reference position 35. Therefore, the position estimation apparatus 10 according to the first embodiment can use the target reference position 34 and the nearby reference position 35 that are appropriate for estimating the relative position, and thus can appropriately estimate the relative position between the target object 100 and the nearby object 200.

The position estimation apparatus 10 according to the first embodiment identifies the target reference position 34 and the nearby reference position 35, based on whether or not the particular state is satisfied. The particular state is a state in which a preceding one of the mobile objects of the target object 100 and the nearby object 200 has made a right or left turn, and then a following one of the mobile objects has not made a right or left turn. Therefore, the position estimation apparatus 10 according to the first embodiment can use the target reference position 34 and the nearby reference position 35 that are appropriate.

Other Configurations

First Variation

Figure 7:
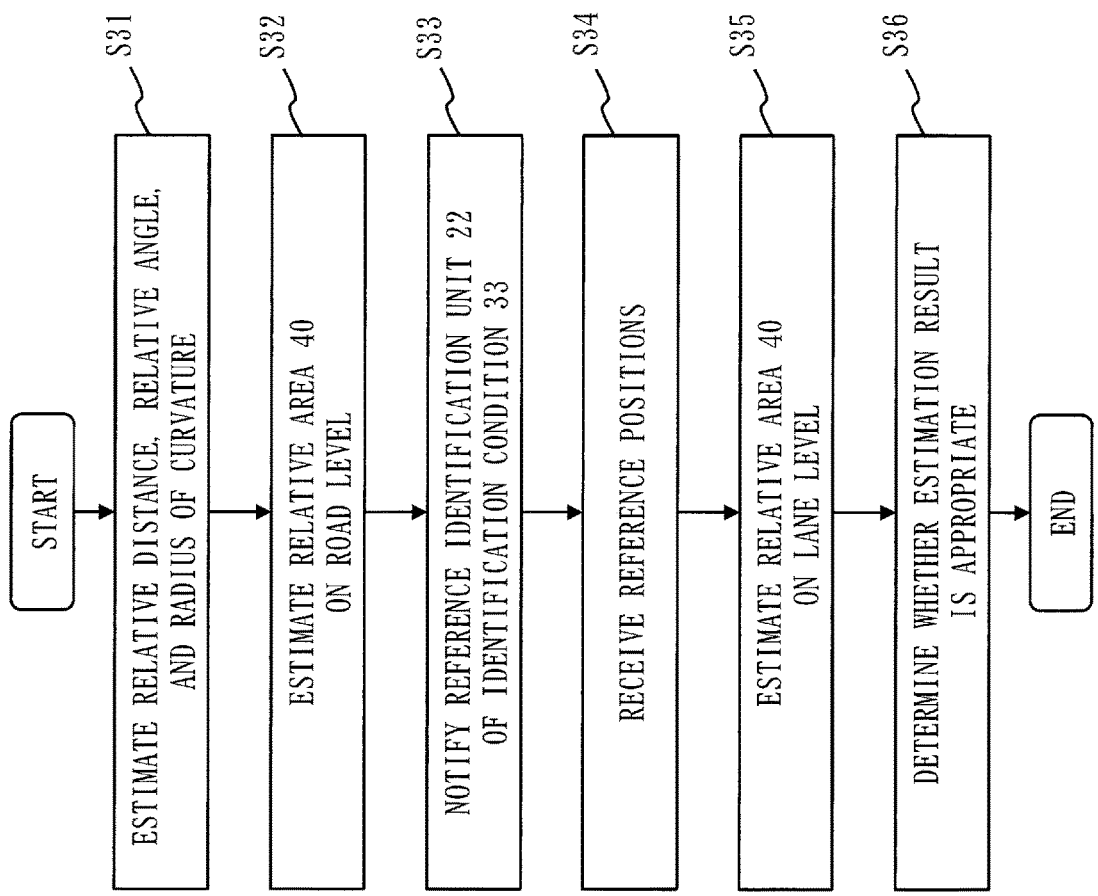
FIG. 7 is a flowchart of the operation of a position estimation unit 23 according to the first embodiment.

In the first embodiment, at step S36 of FIG. 7, the position estimation unit 23 determines whether or not the estimated relative area 40 is appropriate, based on the relationship with the relative area 40 estimated in the past fixed distance. However, the position estimation unit 23 may estimate the relative area 40 by also taking into consideration the relative areas 40 that have been previously estimated.

As a specific example, the position estimation unit 23 counts, for each relative area 40, the number of occasions when the presence of the nearby object 200 is estimated in a past fixed time period. Then, the position estimation unit 23 estimates that the nearby object 200 is present in the relative area 40 with the largest number of occasions when the presence is estimated.

As another specific example, the position estimation unit 23 weights each of the relative areas 40 according to the relative areas 40 estimated in the past fixed distance. Then, the position estimation unit 23 estimates the relative area 40 in which the nearby object 200 is present by taking the weights into consideration. For example, the position estimation unit 23 calculates a probability that the nearby object 200 is present in each of the relative areas 40 at step S32 and step S35. The position estimation unit 23 weights the probability of being present in each of the relative areas 40 at step S36. Then, the position estimation unit 23 estimates that the nearby object 200 is present in the relative area 40 for which a large value is obtained.

Second Variation

Figure 8:
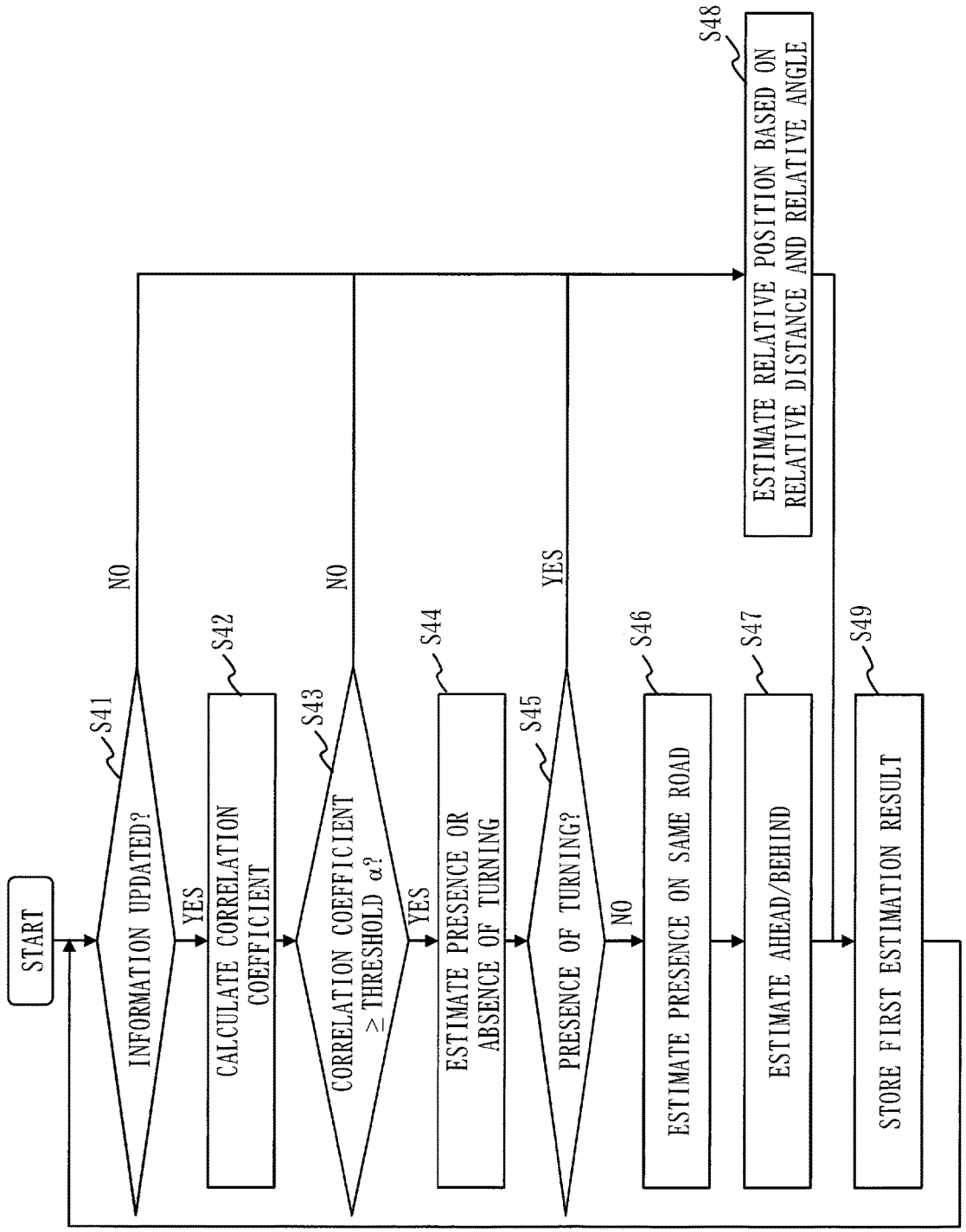
FIG. 8 is a flowchart of a first estimation process according to the first embodiment.

In the first embodiment, at step S42 of FIG. 8, the position estimation unit 23 calculates the correlation coefficient between the position of the target object 100 and the position of the nearby object 200. At step S42, the position estimation unit 23 may calculate the correlation coefficient separately for each of latitude, longitude, altitude, and orientation. In this case, at step S43, if two or more correlation coefficients of the four correlation coefficients calculated at step S42 are greater than or equal to a threshold α, the position estimation unit 23 advances the process to step S44. On the other hand, if not more than one correlation efficient of the four correlation coefficients calculated at step S42 is greater than or equal to the threshold α, the position estimation unit 23 advances the process to step S48.

Third Variation

Figure 11:
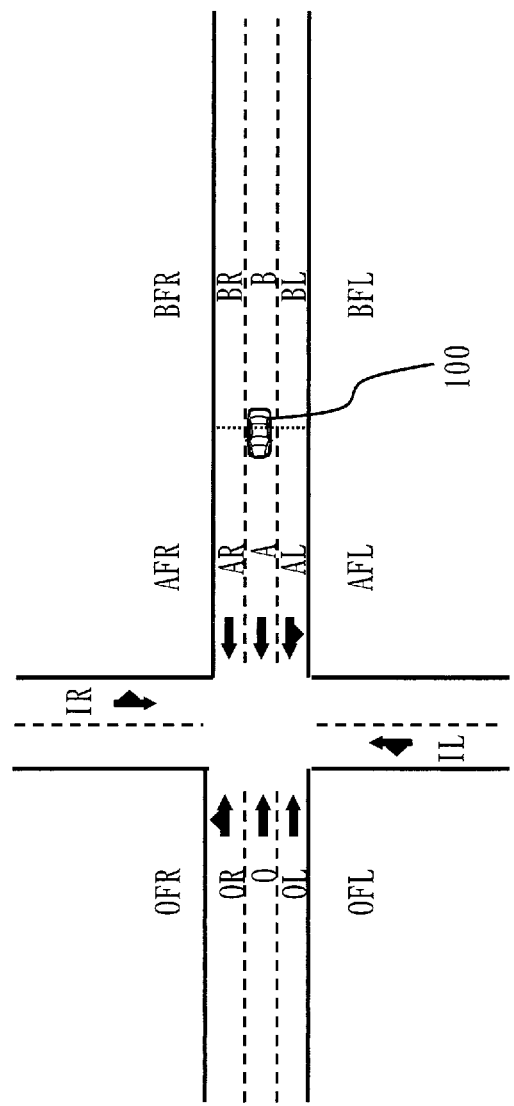
FIG. 11 is an explanatory diagram of relative areas 40 according to a third variation.

In the first embodiment, the areas illustrated in FIG. 2 are assumed to be the relative areas 40. However, the relative areas 40 may be defined by taking into consideration a difference between the traveling directions of the target object 100 and the nearby object 200. As a specific example, as illustrated in FIG. 11, O (Oncoming), OL (Oncoming Left), OR (Oncoming Right), OFL (Oncoming Far Left), and OFR (Oncoming Far Right) may be defined as the relative areas 40 in addition to the areas illustrated in FIG. 2.

Area O is ahead of the target object 100 in the lane in which the target object 100 is present and is opposite in direction to the target object 100. Area OL is ahead of the target object 100 in the adjacent lane to the left of the target object 100 and is opposite in direction to the target object 100. Area OR is ahead of the target object 100 in the adjacent lane to the right of the target object 100 and is opposite in direction to the target object 100. Area OFL is ahead of the target object 100 in the second or subsequent adjacent lane to the left of the target object 100 and is opposite in direction to the target object 100. Area OFR is ahead of the target object 100 in the second or subsequent adjacent lane to the right of the target object 100 and is opposite in direction to the target object 100.

In this case, the position estimation unit 23 estimates the relative area 40 by also taking into consideration the traveling directions of the target object 100 and the nearby object 200.

Fourth Variation

In the first embodiment, the functions of the functional components of the position estimation apparatus 10 are realized by software. As a fourth variation, the functions of the functional components of the position estimation apparatus 10 may be realized by hardware. Differences in the fourth variation from the first embodiment will be described.

Figure 12:
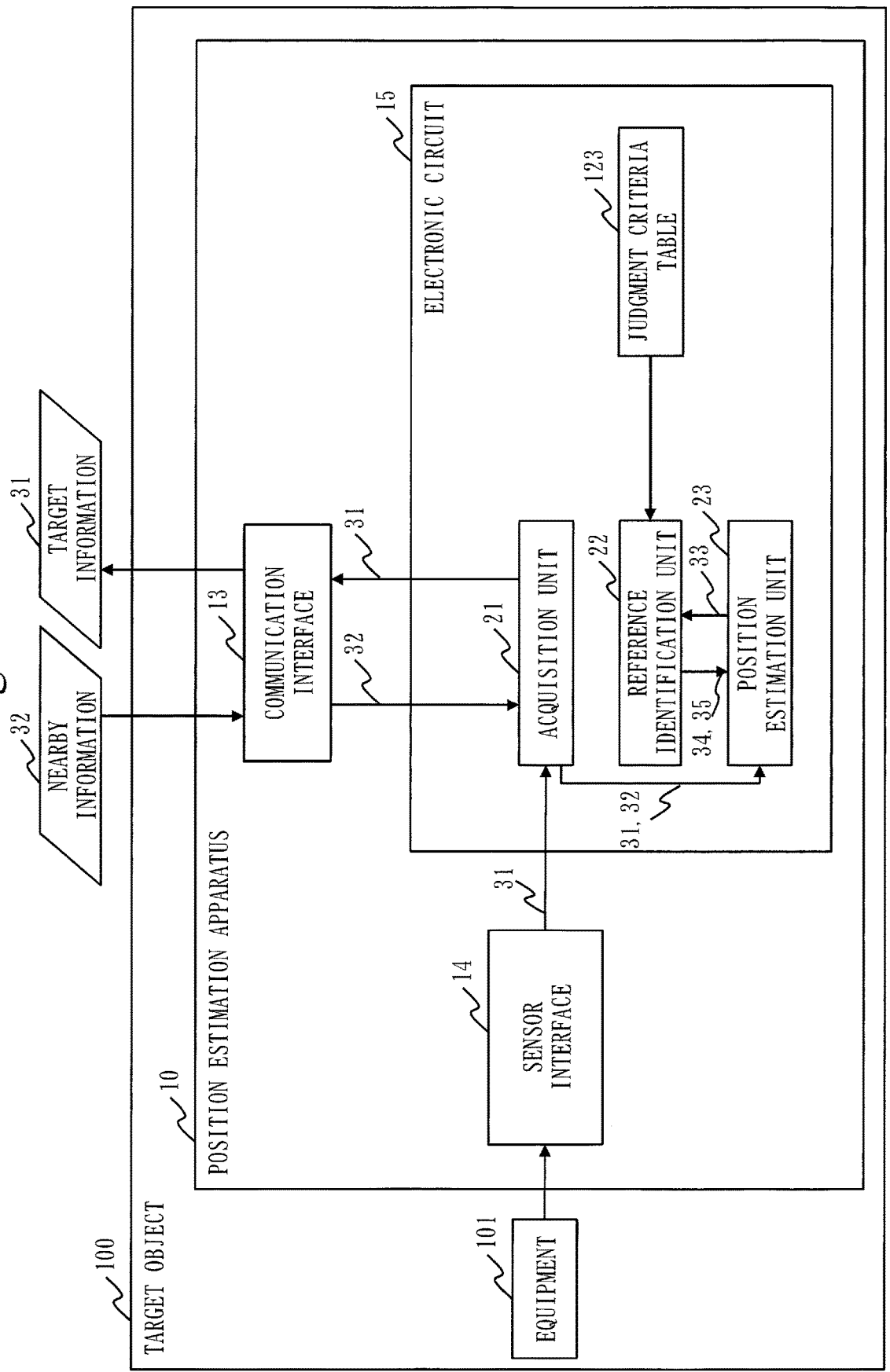
FIG. 12 is a configuration diagram of a position estimation apparatus 10 according to a fourth variation.

A configuration of a position estimation apparatus 10 according to the fourth variation will be described with reference to FIG. 12.

When the functions of the functional components are realized by hardware, the position estimation apparatus 10 includes a communication interface 13, a sensor interface 14, and an electronic circuit 15. The electronic circuit 15 is a dedicated electronic circuit that realizes the functions of the functional components of the position estimation apparatus 10 and the function of the storage device 12.

The electronic circuit 15 is assumed to be a single circuit, a composite circuit, a programmed processor, a parallel-programmed processor, a logic IC, a gate array (GA), an application specific integrated circuit (ASIC), or a field-programmable gate array (FPGA).

The functions of the functional components may be realized by one electronic circuit 15, or the functions of the functional components may be realized by being distributed among a plurality of electronic circuits 15.

Fifth Variation

As a fifth variation, some of the functions may be realized by hardware, and the rest of the functions may be realized by software. That is, some of the functions of the functional components of the position estimation apparatus 10 may be realized by hardware, and the rest of the functions may be realized by software.

The processor 11, the storage device 12, and the electronic circuit 15 are collectively referred to as processing circuitry. That is, regardless of whether the configuration of the position estimation apparatus 10 is that illustrated in FIG. 1 or FIG. 12, the functions of the functional components are realized by the processing circuitry.

Second Embodiment

A second embodiment differs from the first embodiment in that at least one of alteration of shapes of the relative areas 40 and rotation of the relative areas 40 is performed based on the movement state. In the second embodiment, this difference will be described, and description of the same portions will be omitted.

Description of Configuration

Figure 13:
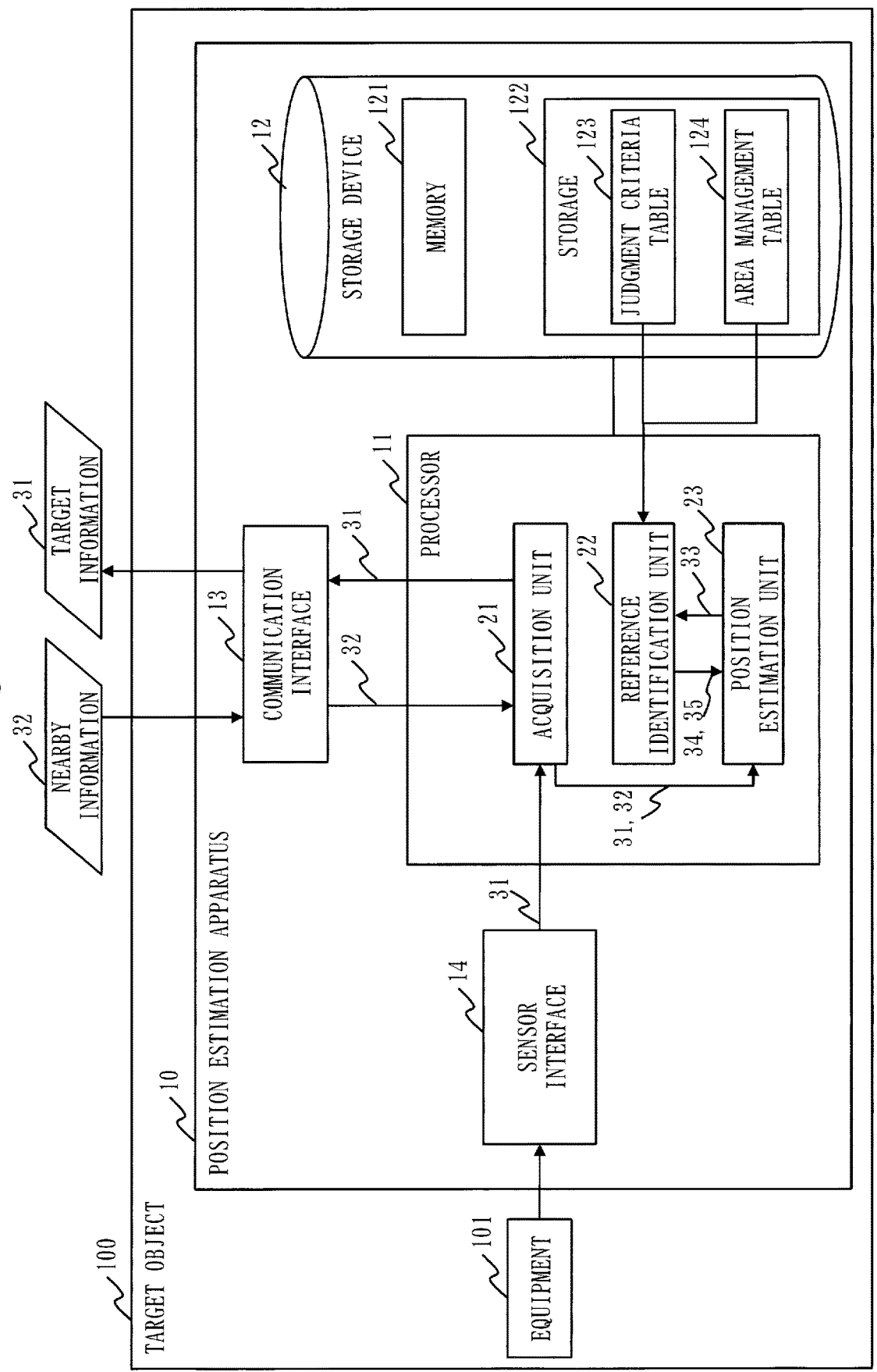
FIG. 13 is a configuration diagram of a position estimation apparatus 10 according to a second embodiment.

A configuration of a position estimation apparatus 10 according to the second embodiment will be described with reference to FIG. 13.

The position estimation apparatus 10 differs from the position estimation apparatus 10 according to the first embodiment in that an area management table 124 is stored in the storage 122.

Description of Operation

Information stored in the area management table 124 according to the second embodiment will be described with reference to FIG. 14.

The area management table 124 stores an area shape and an area rotation amount for each movement state. Note that "position error" in the movement state column is a case where a position estimation error is greater than a threshold th".

The area shape is a shape of the relative area 40. For example, when the movement state is "moving straight ahead", the area shape is rectangular. When the movement state is "curve", the area shape is curvilinear. The curvature of the curvilinear shape may be a value corresponding to the curvature of the curve, or may be a fixed curvature.

The area rotation amount is an amount by which the relative area 40 is rotated. For example, when the movement state is "moving straight ahead", the area rotation amount is none. When the movement state is "during turning", the area rotation amount is a difference between the orientations of the target object 100 and the nearby object 200. When the movement state is "waiting to turn right", the area rotation amount is an amount of orientation change from a reference position. Note that the reference position here is the position of a stop line of an intersection or the like.

An example of setting the area shape and the area rotation amount according to the second embodiment will be described with reference to FIGS. 15 and 16.

Figure 15:
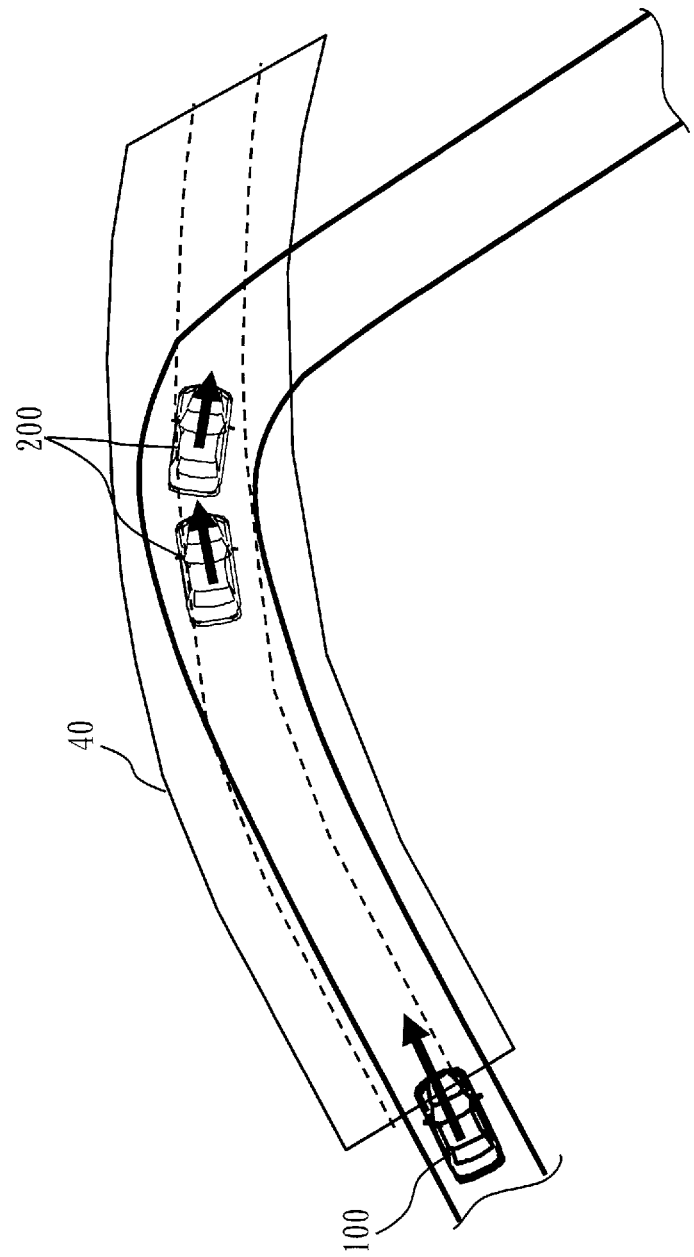
FIG. 15 is an explanatory diagram of an example of setting an area shape and an area rotation amount according to the second embodiment.

FIG. 15 illustrates a case where the movement state of the nearby object 200 is "curve". When the movement state is "curve", the area shape is curvilinear. When the movement state is "curve", the area rotation amount is none. Therefore, the relative areas 40 around the nearby object 200 are defined as curvilinear shapes. In this way, the relative areas 40 are defined as shapes similar to the shape of the road.

Figure 16:
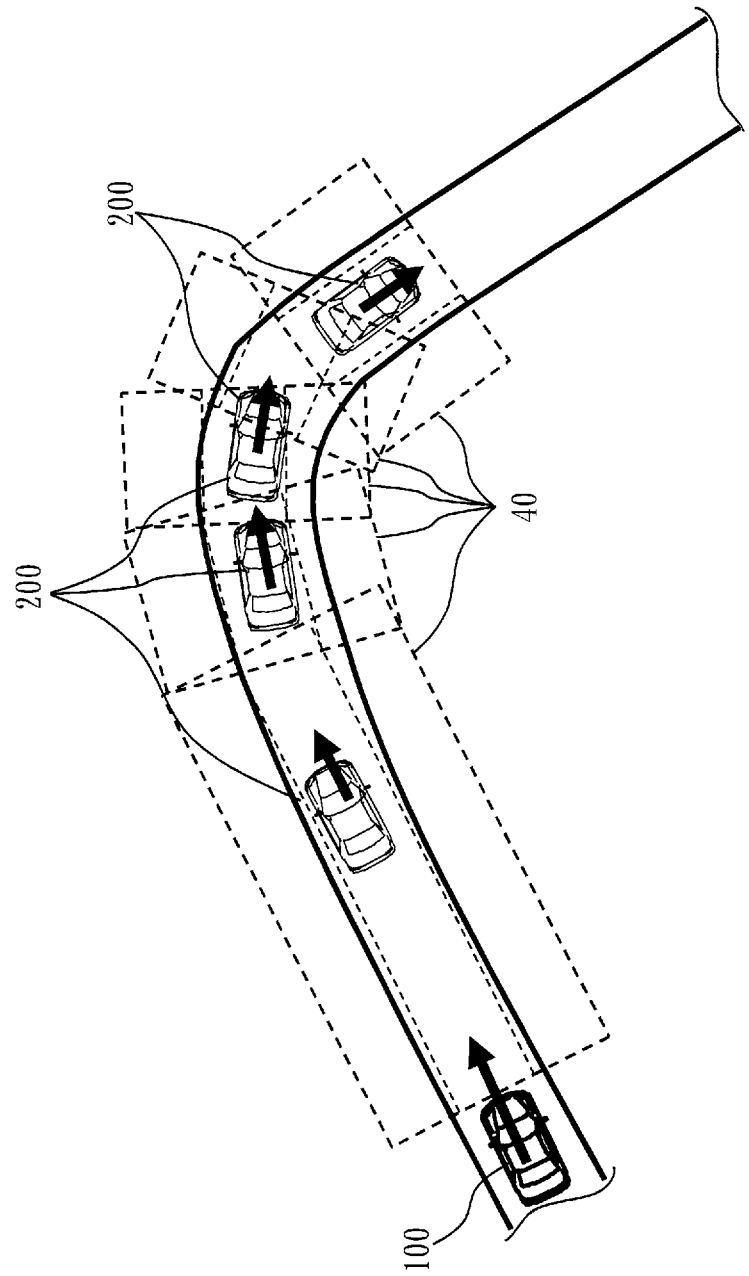
FIG. 16 is an explanatory diagram of an example of setting an area shape and an area rotation amount according to the second embodiment.

FIG. 16 illustrates a case where the movement state of the nearby object 200 is "during turning". When the movement state is "during turning", the area shape is rectangular. When the movement state is "during turning", the area rotation amount is a difference between the orientations of the target object 100 and the nearby object 200. Therefore, the relative areas 40 between the target object 100 and the nearby object 200 are defined as rectangles rotated at fixed distance intervals. In this way, the relative areas 40 between the target object 100 and the nearby object 200 are defined as shapes similar to the shape of the road.

The processes to acquire information on the nearby object 200 and estimate a relative area 40 according to the second embodiment will be described with reference to FIG. 6.

The processes of step S21 to step S22 and the process of step S24 are the same as those of the first embodiment.

Step S23: Reference Identification Process

The reference identification unit 22 identifies the target reference position 34 of the target object 100 and the nearby reference position 35 of the nearby object 200, as in the first embodiment.

The reference identification unit 22 refers to the area management table 124 to identify the area shape and the area rotation amount that correspond to the radius of curvature of the road. Then, the reference identification unit 22 defines the relative areas 40 based on the identified area shape and area rotation amount. The reference identification unit 22 writes the defined relative areas 40 in the memory 121.

Effects of Second Embodiment

As described above, the position estimation apparatus 10 of the second embodiment defines the relative areas 40 according to the movement states of the target object 100 and the nearby object 200. In this way, the relative areas 40 can be defined in accordance with the shape of the road. As a result, the relative position can be estimated more appropriately.

For example, by defining the relative areas 40 in accordance with the shape of the road, it is possible to more appropriately estimate whether the target object 100 and the nearby object 200 are in the same lane or in adjacent lanes. Whether the likelihood of collision between the target object 100 and the nearby object 200 is high or low varies with whether the target object 100 and the nearby object 200 are in the same lane or in adjacent lanes.

Third Embodiment

A third embodiment differs from the first and second embodiments in that the target reference position 34 and the nearby reference position 35 are identified, based on a past movement history and future movement prediction. In the third embodiment, this difference will be described, and description of the same portions will be omitted.

Description of Operation

A method for identifying the target reference position 34 and the nearby reference position 35 according to the third embodiment will be described with reference to FIGS. 17 and 18.

When it is estimated that the target object 100 and the nearby object 200 are moving on the same road, the reference identification unit 22 identifies the target reference position 34 and the nearby reference position 35 as described below.

Figure 17:
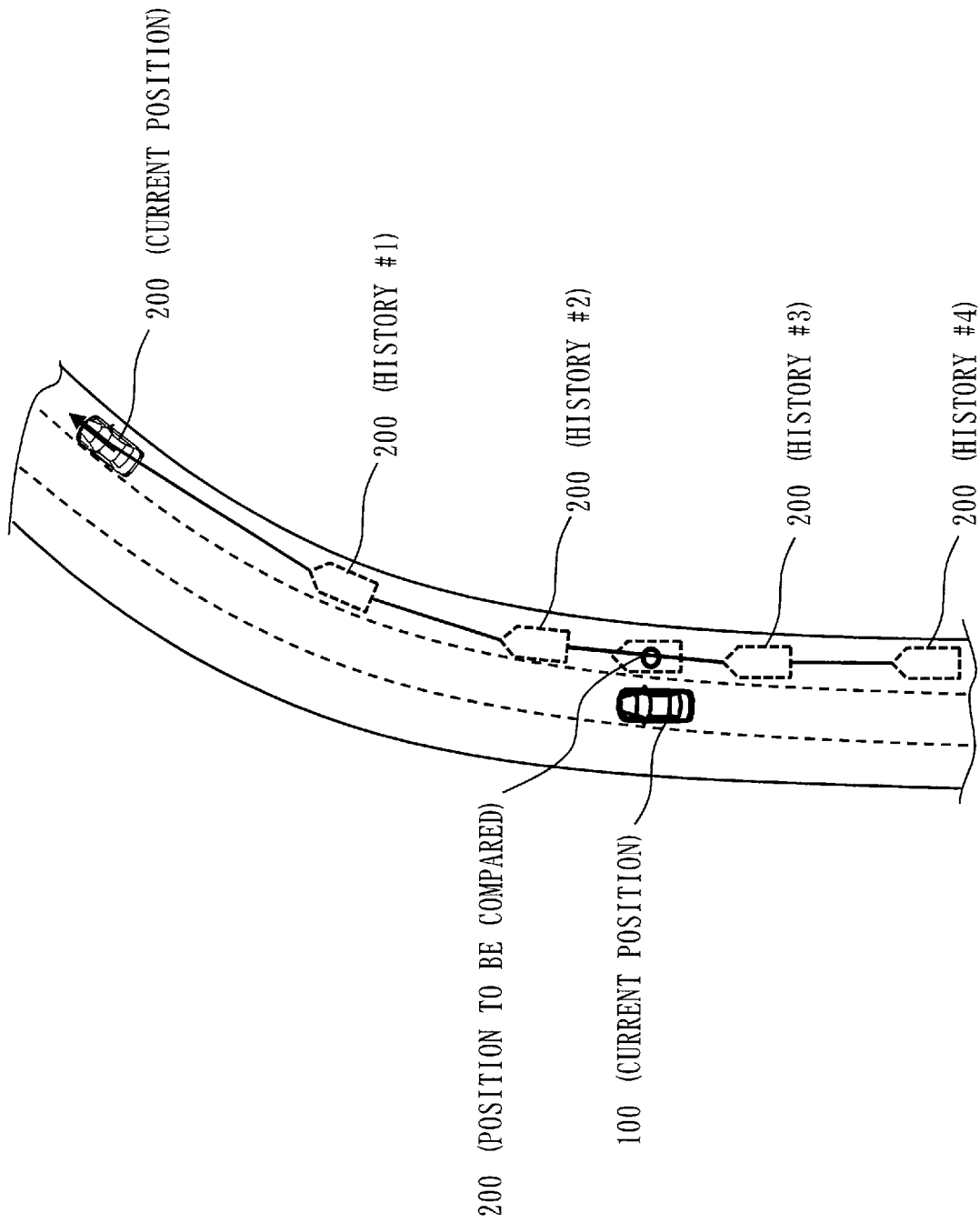
FIG. 17 is an explanatory diagram of a method for identifying a target reference position 34 and a nearby reference position 35 according to a third embodiment.

FIG. 17 illustrates a case where the target reference position 34 and the nearby reference position 35 are identified based on a past movement history.

The reference identification unit 22 refers to a past movement history of a preceding one of the mobile objects of the target object 100 and the nearby object 200. In FIG. 17, the nearby object 200 is the preceding mobile object, so that the reference identification unit 22 refers to a past movement history of the nearby object 200.

Then, the reference identification unit 22 identifies the current position of the target object 100 as the target reference position 34. The reference identification unit 22 identifies the position closest to the current position of the target object 100 among past positions of the nearby object 200, as the nearby reference position 35.

When the target object 100 is the preceding mobile object, the reference identification unit 22 identifies a position close to the current position of the nearby object 200 among the past positions of the target object 100, as the target reference position 34. The reference identification unit 22 identifies the current position of the nearby object 200 as the nearby reference position 35.

Figure 18:
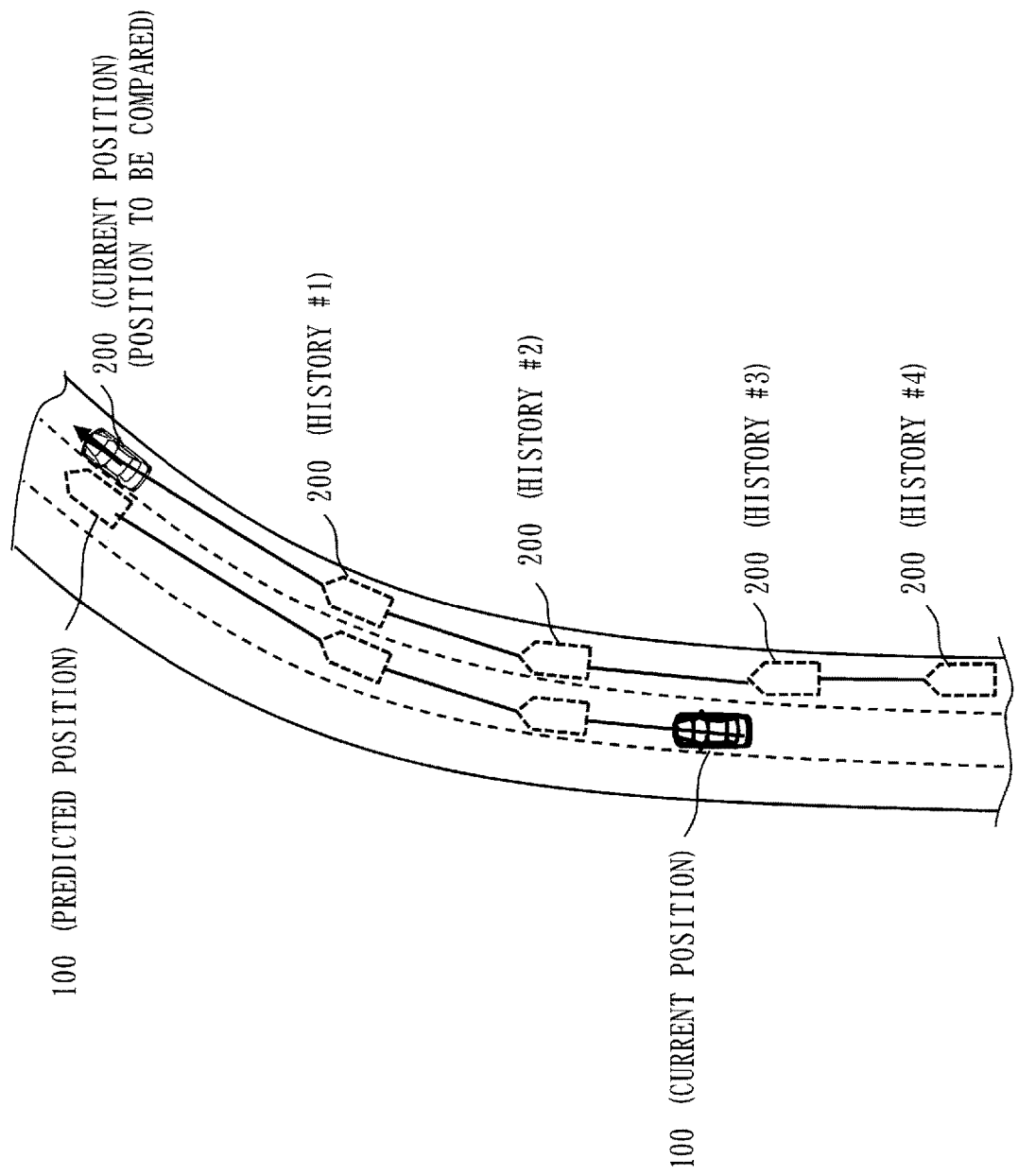
FIG. 18 is an explanatory diagram of a method for identifying the target reference position 34 and the nearby reference position 35 according to the third embodiment.

FIG. 18 illustrates a case where the target reference position 34 and the nearby reference position 35 are identified based on future movement prediction.

The reference identification unit 22 predicts future movements of a following one of the mobile objects of the target object 100 and the nearby object 200. The reference identification unit 22 predicts future movements of the following mobile object based on a past movement history of a preceding mobile object. As a specific example, the reference identification unit 22 predicts future movements of the following mobile object, assuming that the following mobile object moves in the future along the past movement history of the preceding mobile object. In FIG. 18, the target object 100 is the following mobile object, so that the reference identification unit 22 predicts future movements of the target object 100.

Then, the reference identification unit 22 identifies a position close to the current position of the nearby object 200 among positions to which the target object 100 is predicted to move in the future, as the target reference position 34. The reference identification unit 22 identifies the current position of the nearby object 200 as the nearby reference position 35.

When the nearby object 200 is the following mobile object, the reference identification unit 22 identifies the current position of the target object 100 as the target reference position 34. The reference identification unit 22 identifies a position close to the current position of the target object 100 among positions to which the nearby object 200 is predicted to move in the future, as the nearby reference position 35.

Figure 19:
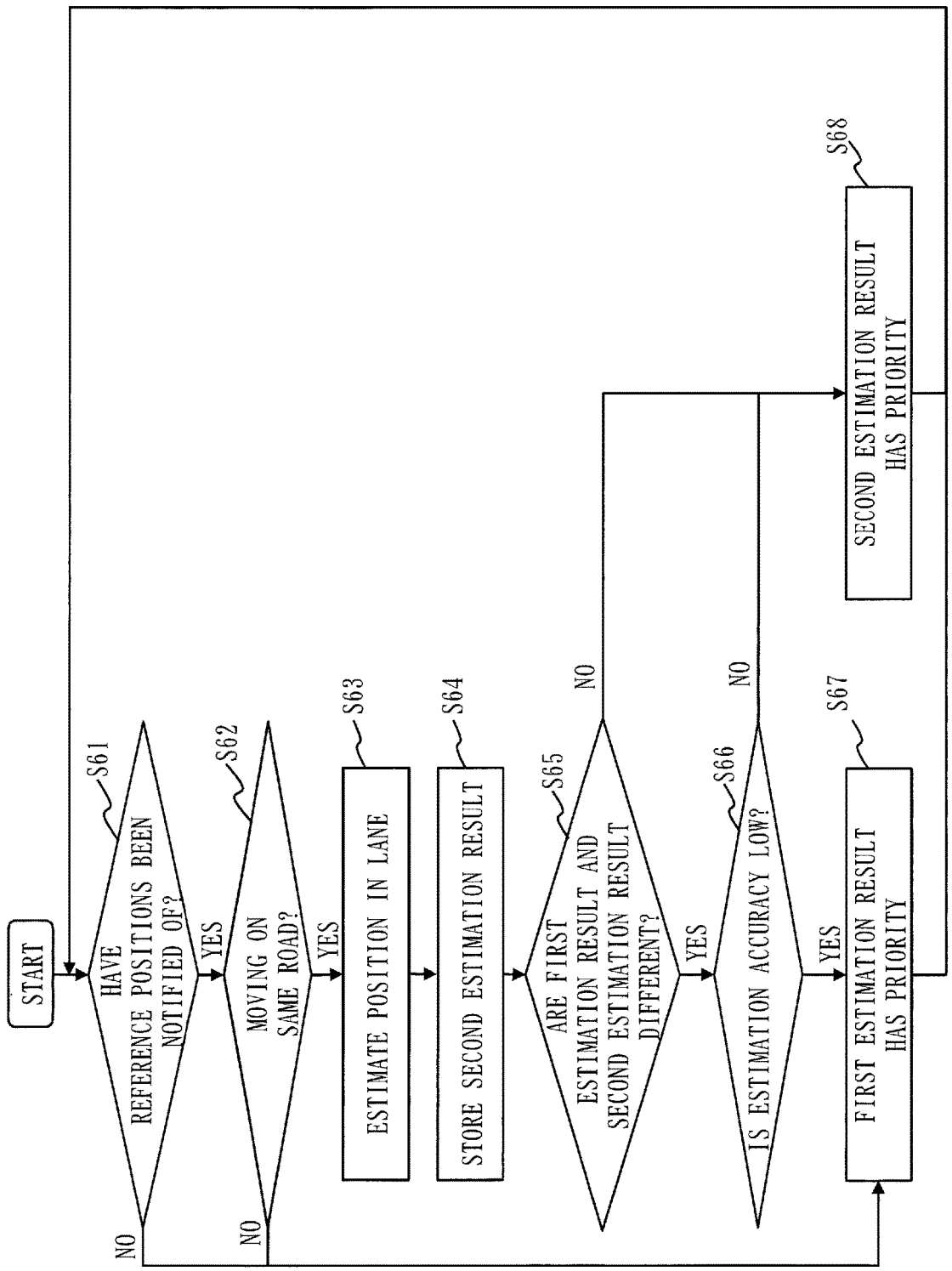
FIG. 19 is a flowchart of a second estimation process according to the third embodiment.

The second estimation process (step S35 of FIG. 7) according to the third embodiment will be described with reference to FIG. 19.

Figure 9:
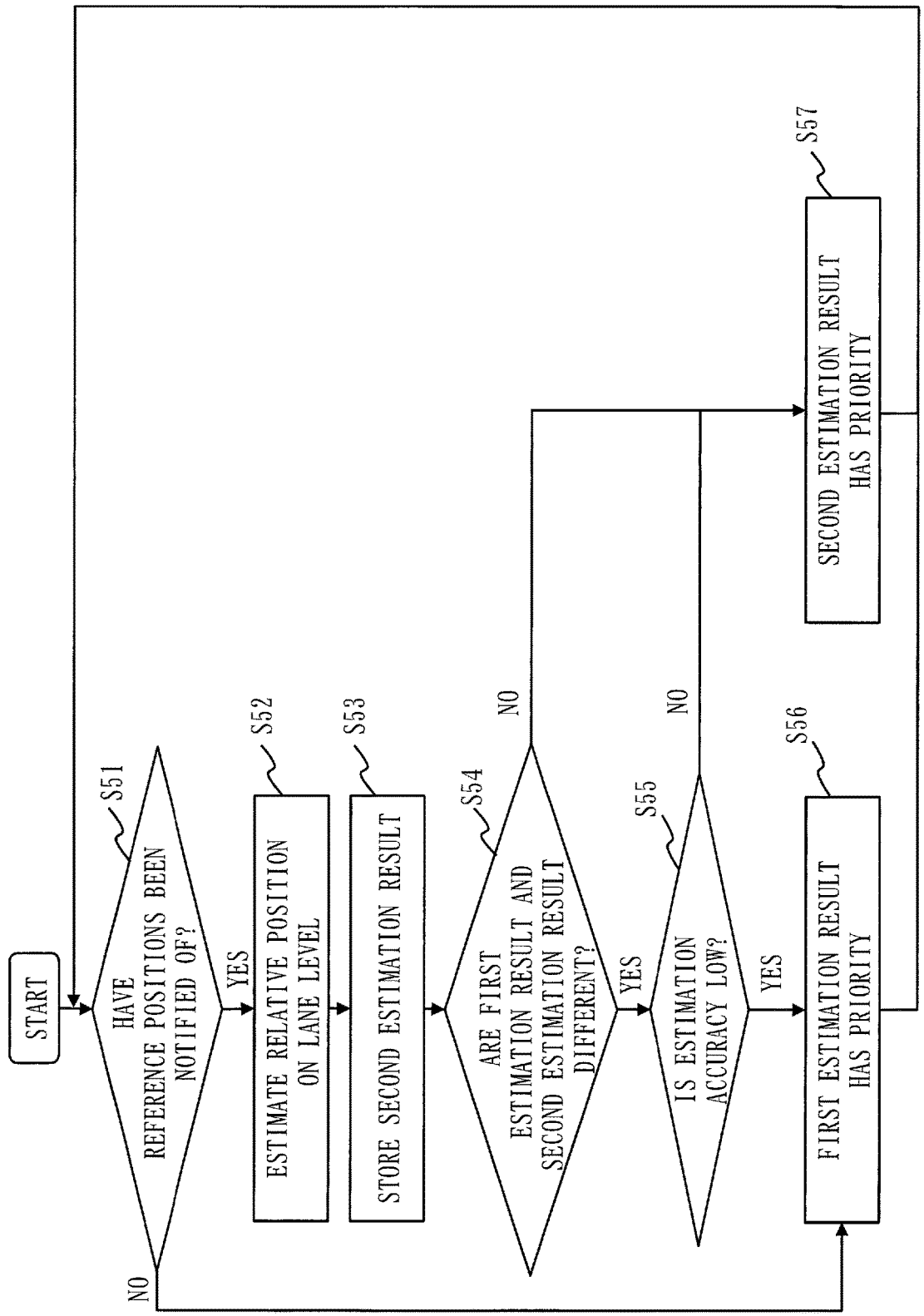
FIG. 9 is a flowchart of a second estimation process according to the first embodiment.

The process of step S61 is the same as the process of step S51 of FIG. 9. The processes of step S64 to step S68 are the same as the processes of step S53 to step S57 of FIG. 9.

Step S62: State Determination Process

At step S62, the position estimation unit 23 determines whether or not it has been estimated that the target object 100 and the nearby object 200 are moving on the same road.

If it has been estimated that the target object 100 and the nearby object 200 are moving on the same road, the position estimation unit 23 advances the process to step S63. On the other hand, if it has not been estimated that the target object 100 and the nearby object 200 are moving on the same road, the position estimation unit 23 advances the process to step S67.

Step S63: Position Estimation Process

The position estimation unit 23 estimates the relative position of the nearby object 200 in the width direction of the road, based on the target reference position 34 and the nearby reference position 35 that have been notified of at step S34. The width direction of the road means a horizontal direction, that is, a lateral direction, with respect to the traveling direction of the target object 100.

The position estimation unit 23 estimates the relative position of the nearby object 200 in the traveling direction, based on the current position of the target object 100 and the current position of the nearby object 200. The traveling direction means a front-back direction, that is, a longitudinal direction, of the target object 100.

Effects of Third Embodiment

As described above, when the target object 100 and the nearby object 200 are moving on the same road, the position estimation apparatus 10 according to the third embodiment identifies the target reference position 34 and the nearby reference position 35, based on a past movement history or future movement prediction. Then, the relative position in the width direction of the road is estimated based on the target reference position 34 and the nearby reference position 35. In this way, even when the shape of the road changes, such as when the road curves to the left and to the right, the relative position in the width direction of the road can be accurately estimated.

Other Configuration

Sixth Variation

Figure 20:
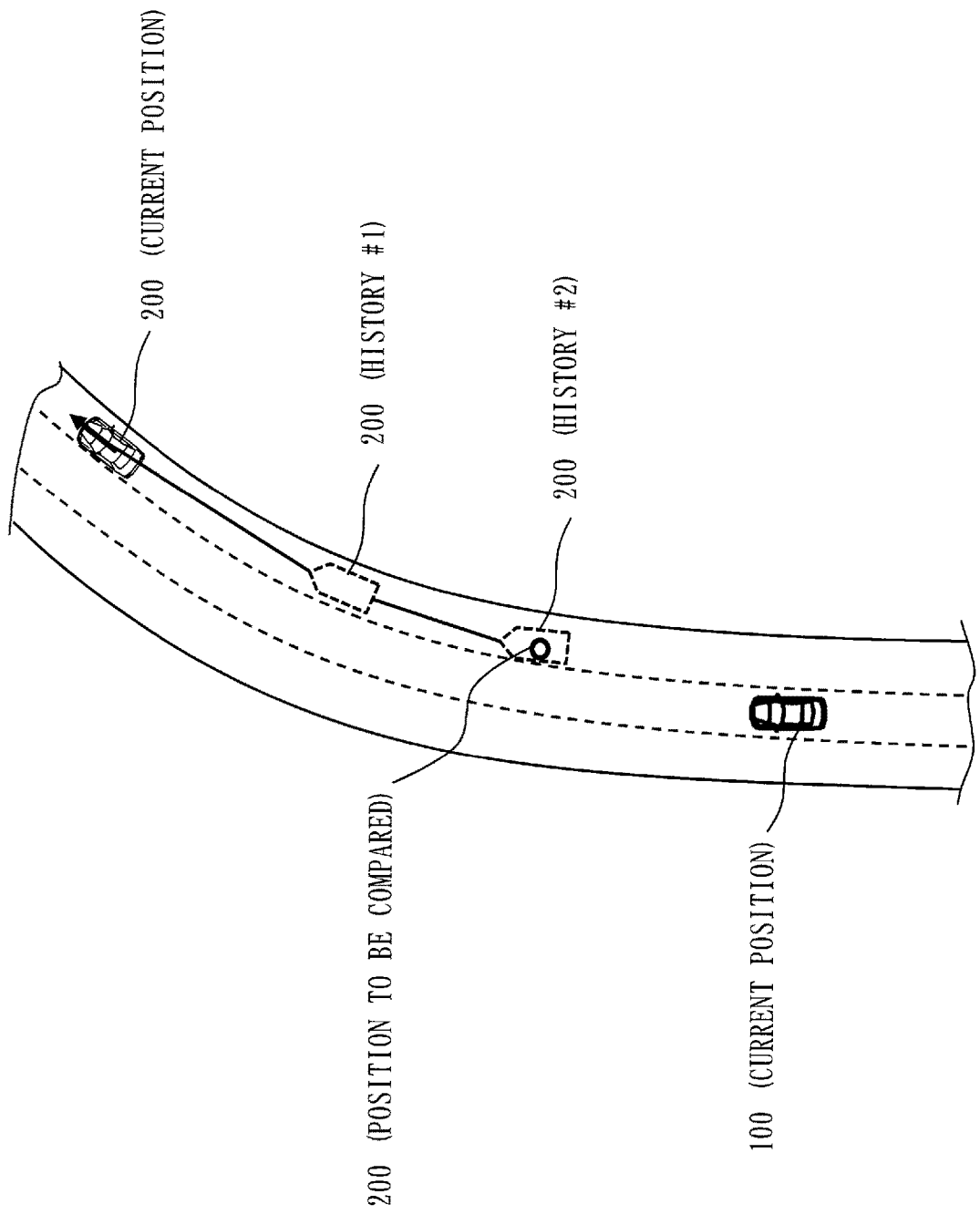
FIG. 20 is an explanatory diagram of a method for identifying the target reference position 34 and the nearby reference position 35 according to a sixth variation.

As illustrated in FIG. 20, there may be a case where the distance of an obtained movement history of the target object 100 or the nearby object 200 is short, and at least one of the target reference position 34 and the nearby reference position 35 cannot be identified by the method described based on FIGS. 17 and 18. In FIG. 20, only a movement history of the nearby object 200 from a position ahead of the current position of the target object 100 has been obtained. For this reason, the reference identification unit 22 cannot identify the position closest to the current position of the target object 100 by the method described based on FIG. 17. Therefore, the reference identification unit 22 cannot identify the nearby reference position 35.

In this case, the reference identification unit 22 may identify the position closest to the current position of the target object 100 among past positions of the nearby object 200 in the obtained movement history, as the nearby reference position 35. That is, in FIG. 20, the reference identification unit 22 may identify history #2 as the nearby reference position 35.

Alternatively, in this case, the reference identification unit 22 may identify the target reference position 34 and the nearby reference position 35 by referring to a movement history of another nearby object 200. As illustrated in FIG. 21, it is assumed that another nearby object 200Y is present, apart from a nearby object 200X to be the subject. In this case, the future movement of the target object 100 is predicted based on a movement history of the other nearby object 200Y. Then, the reference identification unit 22 identifies a position close to a past position of the nearby object 200X among positions to which the target object 100 is predicted to move in the future, as the target reference position 34. The reference identification unit 22 identifies the position closest to the position to which the target object 100 is predicted to move in the future among past positions of the nearby object 200X, as the nearby reference position 35.

Fourth Embodiment

A fourth embodiment differs from the first to third embodiments in that a relative position between a target object 100 and a nearby object 200 is estimated based on the correlation coefficient between a plurality of nearby objects 200. In the fourth embodiment, this difference will be described, and description of the same portions will be omitted.

Description of Operation

A method for estimating a relative position between a target object 100 and a nearby object 200 according to the fourth embodiment will be described with reference to FIG. 22.

FIG. 22 illustrates two nearby objects 200, namely, a nearby object 200X and a nearby object 200Y. In this case, the position estimation unit 23 calculates the correlation coefficient between the target object 100 and each of the nearby objects 200, and also calculate the correlation coefficient between the nearby objects 200. It is assumed here that the correlation coefficient between the target object 100 and the nearby object 200X is greater than or equal to a threshold $\alpha$, the correlation coefficient between the target object 100 and the nearby object 200Y is lower than the threshold $\alpha$, and the correlation coefficient between the nearby object 200X and the nearby object 200Y is greater than or equal to the threshold $\alpha$.

In this case, since the correlation coefficient between the target object 100 and the nearby object 200Y is lower than the threshold $\alpha$, it is estimated that the target object 100 and the nearby object 200Y are not moving on the same road. However, since the correlation coefficient between the target object 100 and the nearby object 200X is greater than or equal to the threshold $\alpha$, it is estimated that the target object 100 and the nearby object 200X are moving on the same road. Since the correlation coefficient between the nearby object 200X and the nearby object 200Y is greater than or equal to the threshold $\alpha$, it is estimated that the nearby object 200X and the nearby object 200Y are moving on the same road. Therefore, it can be estimated that the target object 100 and the nearby object 200Y are also moving on the same road.

That is, by calculating the correlation coefficient between nearby objects 200, a nearby object 200 that is not estimated to be moving on the same road when only the correlation coefficient between the target object 100 and the nearby object 200 is calculated can also be estimated to be moving on the same road.

The first estimation process (step S32 of FIG. 7) according to the fourth embodiment will be described with reference to FIG. 8. The process of step S41 and the processes of step S44 to step S49 are the same as those of the first embodiment.

Step S42: Coefficient Calculation Process

The position estimation unit 23 calculates the correlation coefficient between the position of the target object 100 and the position of the nearby object 200 to be the subject of the process, as in the first embodiment. The position estimation unit 23 also calculates the correlation coefficient between the position of the target object 100 and the position of another nearby object 200 different from the subject of the process, and the correlation coefficient between the nearby object 200 to be the subject of the process and the other nearby object 200.

A method for calculating the correlation coefficient between the nearby objects 200 is substantially the same as the method for calculating the correlation coefficient between the position of the target object 100 and the position of the nearby object 200 to be the subject of the process.

Step S43: Coefficient Determination Process

If the correlation coefficient between the position of the target object 100 and the position of the nearby object 200 to be the subject of the process is greater than or equal to the threshold $\alpha$, the position estimation unit 23 advances the process to step S44. If the correlation coefficient between the position of the nearby object 200 to be the subject of the process and another nearby object 200Z different from the subject of the process is greater than or equal to the threshold α and the correlation coefficient between the position of the target object 100 and the position of the nearby object 200Z is greater than or equal to the threshold α, the position estimation unit 23 advances the process to step S44.

On the other hand, in other cases, the position estimation unit 23 advances the process to step S48.

Effects of Fourth Embodiment

As described above, the position estimation apparatus 10 according to the fourth embodiment estimates whether or not the target object 100 and the nearby object 200 are moving on the same road, based on the correlation coefficient between a plurality of nearby objects 200. In this way, the relative position between the target object 100 and the nearby object 200 can be appropriately estimated.

The embodiments of the present invention have been described above. Two or more of these embodiments and the variations may be implemented in combination. Alternatively, one or more of these embodiments and the variations may be implemented partially. Note that the present invention is not limited to the above embodiments and variations, and various modifications are possible as necessary.

REFERENCE SIGNS LIST

10: position estimation apparatus, 11: processor, 12: storage device, 121: memory, 122: storage, 123: judgment criteria table, 124: area management table, 13: communication interface, 14: sensor interface, 15: electronic circuit, 21: acquisition unit, 22: reference identification unit, 23: position estimation unit, 31: target information, 32: nearby information, 33: identification condition, 34: target reference position, 35: nearby reference position, 100: target object, 200: nearby object

The invention claimed is:

1. A position estimation apparatus comprising:
    processing circuitry to:
        while a target object which is a mobile object is moving, acquire target information indicating a position history of the target object, and acquire nearby information indicating a position history of a nearby object which is a mobile object different from the target object;
        identify a target reference position to be a reference from the position history indicated in the target information, based a movement state of the target object estimated from the acquired target information, and identify a nearby reference position to be a reference from the position history indicated in the nearby information, based on a movement state of the nearby object estimated from the nearby information, where the movement state indicates a shape of a road being traveled and a position on the road being traveled; and
        estimate a relative position between the target object and the nearby object by comparing the identified target reference position and the identified nearby reference position, wherein
    the processing circuitry estimates, as the relative position between the target object and the nearby object, a relative area in which the nearby object is present among a plurality of relative areas obtained by dividing an area around the target object, and
    the processing circuitry performs at least one of alteration of a shape of the relative area and rotation of the relative area, based on at least one of the movement state of the target object and the movement state of the nearby object.

2. The position estimation apparatus according to claim 1, wherein the movement state indicates a shape of a road being traveled and a position on the road being traveled.

3. The position estimation apparatus according to claim 1, wherein the processing circuitry identifies the target reference position and the nearby reference position in accordance with whether or not a particular state is satisfied, the particular state being a state in which a preceding one of the mobile objects of the target object and the nearby object has made a right or left turn and then a following one of the mobile objects has not made a right or left turn.

4. The position estimation apparatus according to claim 3, wherein when the particular state is satisfied, the processing circuitry determines a current position of the target object as the target reference position, and identifies a current position of the nearby object as the nearby reference position, and when the particular state is not satisfied, the processing circuitry determines a position corresponding to the movement state of the target object as the target reference position, and identifies a position corresponding to the movement state of the nearby object as the nearby reference position.

5. The position estimation apparatus according to claim 1, wherein the processing circuitry calculates a probability that the nearby object is present in each lane, according to a probability distribution defined with respect to a width direction of a road for each of lanes constituting the road, and estimates a lane in which the nearby object is present, based on a sum of probabilities for the lanes calculated in a past reference time period.

6. The position estimation apparatus according to claim 1, wherein the processing circuitry performs a first estimation to estimate a position of a road on which the nearby object is present with respect to a road on which the target object is present, based on the target information and the nearby information, and performs a second estimation to estimate a position of a lane in which the nearby object is present with respect to a lane in which the target object is present, based on the target reference position and the nearby reference position.

7. The position estimation apparatus according to claim 1, wherein when it is estimated that the target object and the nearby object are moving on a same road, based on the movement state of the target object and the movement state of the nearby object, the processing circuitry identifies a current position of the target object as the target reference position, and identifies a position close to the current position of the target object among past positions of the nearby object, as the nearby reference position; or identifies a position close to a current position of the nearby object among past positions of the target object, as the target reference position, and identifies the current position of the nearby object as the nearby reference position; or identifies the current position of the target object as the target reference position, and identifies a position close to the current position of the target object among positions to which the nearby object is predicted to move in future, as the nearby reference position; or identifies a position close to the current position of the nearby object among positions to which the target object is predicted to move in future, as the target reference position, and identifies the current position of the nearby object as the nearby reference position.

8. The position estimation apparatus according to claim 7, wherein the processing circuitry estimates a relative position in a width direction of the road, based on the target reference position and the nearby reference position, and estimates a relative position in a traveling direction of the road, based on the current position of the target object and the current position of the nearby object.

9. The position estimation apparatus according to claim 1, wherein the processing circuitry calculates a correlation coefficient between a position of the target object and a position of each of a plurality of nearby objects, calculate a correlation coefficient between each pair of the plurality of nearby objects, and estimate a nearby object that is moving on a same road as a road on which the target object is moving, based on the calculated correlation coefficients, and estimates the relative position between the target object and the nearby object by referring to a result of estimation of the nearby object that is moving on the same road.

10. A position estimation apparatus comprising:
processing circuitry to:
while a target object which is a mobile object is moving, acquire target information indicating a position history of the target object, and acquire nearby information indicating a position history of a nearby object which is a mobile object different from the target object;
identify a target reference position to be a reference from the position history indicated in the target information, based a movement state of the target object estimated from the acquired target information, and identify a nearby reference position to be a reference from the position history indicated in the nearby information, based on a movement state of the nearby object estimated from the nearby information, where the movement state indicates a shape of a road being traveled and a position on the road being traveled; and
estimate a relative position between the target object and the nearby object by comparing the identified target reference position and the identified nearby reference position, wherein
the processing circuitry performs a first estimation to estimate a position of a road on which the nearby object is present with respect to a road on which the target object is present, based on the target information and the nearby information, and performs a second estimation to estimate a position of a lane in which the nearby object is present with respect to a lane in which the target object is present, based on the target reference position and the nearby reference position, and
when accuracy of the second estimation is lower than a reference accuracy, the processing circuitry outputs the position estimated by the first estimation as an estimation result, and when the accuracy of the second estimation is higher than or equal to the reference accuracy, the processing circuitry outputs the position estimated by the second estimation as the estimation result.

11. A position estimation method comprising:
acquiring, while a target object which is a mobile object is moving, target information indicating a position history of the target object, and acquiring nearby information indicating a position history of a nearby object which is a mobile object different from the target object;
identifying a target reference position to be a reference from the position history indicated in the target information, based a movement state of the target object estimated from the target information, and identifying a nearby reference position to be a reference from the position history indicated in the nearby information, based on a movement state of the nearby object estimated from the nearby information, where the movement state indicates a shape of a road being traveled and a position on the road being traveled; and
estimating a relative position between the target object and the nearby object by comparing the target reference position with the nearby reference position, wherein
the processing circuitry estimates, as the relative position between the target object and the nearby object, a relative area in which the nearby object is present among a plurality of relative areas obtained by dividing an area around the target object, and
the processing circuitry performs at least one of alteration of a shape of the relative area and rotation of the relative area, based on at least one of the movement state of the target object and the movement state of the nearby object.

12. A non-transitory computer readable medium storing a position estimation program that causes a computer to execute:
an acquisition process to, while a target object which is a mobile object is moving, acquire target information indicating a position history of the target object, and acquire nearby information indicating a position history of a nearby object which is a mobile object different from the target object;
a reference identification process to identify a target reference position to be a reference from the position history indicated in the target information, based a movement state of the target object estimated from the target information acquired by the acquisition process, and identify a nearby reference position to be a reference from the position history indicated in the nearby information, based on a movement state of the nearby object estimated from the nearby information, where the movement state indicates a shape of a road being traveled and a position on the road being traveled; and
a position estimation process to estimate a relative position between the target object and the nearby object by comparing the target reference position and the nearby reference position that are identified by the reference identification process, wherein
the processing circuitry estimates, as the relative position between the target object and the nearby object, a relative area in which the nearby object is present among a plurality of relative areas obtained by dividing an area around the target object, and
the processing circuitry performs at least one of alteration of a shape of the relative area and rotation of the relative area, based on at least one of the movement state of the target object and the movement state of the nearby object.

* * * * *